US012436417B2

(12) United States Patent
Kim et al.

(10) Patent No.: US 12,436,417 B2
(45) Date of Patent: Oct. 7, 2025

(54) METHOD OF MANUFACTURING A DISPLAY DEVICE HAVING A PROTECTIVE FILM

(71) Applicant: Samsung Display Co., LTD., Yongin-si (KR)

(72) Inventors: Wonju Kim, Asan-si (KR); Dohyung Ryu, Yongin-si (KR); Wu Hyeon Jung, Seoul (KR); Daehyun Hwang, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/602,767

(22) Filed: Mar. 12, 2024

(65) Prior Publication Data

US 2024/0217163 A1     Jul. 4, 2024

Related U.S. Application Data

(62) Division of application No. 16/854,845, filed on Apr. 21, 2020, now Pat. No. 11,951,673.

(30) Foreign Application Priority Data

Apr. 24, 2019    (KR) ........................ 10-2019-0047751

(51) Int. Cl.
*B29C 53/04*      (2006.01)
*B29C 53/80*      (2006.01)
(Continued)

(52) U.S. Cl.
CPC ............ *G02F 1/1303* (2013.01); *B29C 53/04* (2013.01); *B29C 53/80* (2013.01); *B29L 2031/3475* (2013.01)

(58) Field of Classification Search
CPC ........ B21D 19/10; B21D 22/06; B29C 53/04; B29C 53/80; B29C 2035/0211;
(Continued)

(56) References Cited

U.S. PATENT DOCUMENTS 3,750,450 A    8/1973   Sharp et al.
5,543,094 A    8/1996   Hara et al.
(Continued)

FOREIGN PATENT DOCUMENTS

GB         2195940 A     4/1988
JP         H05088930 U    12/1993
(Continued)

OTHER PUBLICATIONS

Extended European Search Report dated Aug. 17, 2020, Issued in European Patent Application No. 20169283.7.

*Primary Examiner* — Sarang Afzali
*Assistant Examiner* — Darrell C Ford
(74) *Attorney, Agent, or Firm* — CANTOR COLBURN LLP

(57) ABSTRACT

A method of manufacturing a display device including coupling a display panel to a first portion of a window member and coupling a protective film to a first portion of the display panel. The step of coupling of the protective film includes bending both edges of the protective film to an angle of about 90 degrees or more, disposing the bent protective film on the lower portion of the display panel, and coupling the protective film to the display panel.

8 Claims, 25 Drawing Sheets

(51) Int. Cl.
G02F 1/13 (2006.01)
B29L 31/34 (2006.01)

(58) Field of Classification Search
CPC ........... H05K 5/0017; B29L 2031/3475; G02F
2201/50; G02F 1/133305; G02F 1/1303;
G09F 9/301; B29D 11/0073; B29D
11/00788; H10K 71/00
USPC ........... 72/381, 383, 394, 399, 342.1, 342.4,
72/342.5
See application file for complete search history.

(56) References Cited

U.S. PATENT DOCUMENTS

| | | | |
|---|---|---|---|
| 8,397,540 | B2 | 3/2013 | Dannoux et al. |
| 8,484,845 | B2 | 7/2013 | Lin et al. |
| 9,304,538 | B2* | 4/2016 | Aaltonen ............... G06F 1/1637 |
| 10,212,865 | B2* | 2/2019 | Son ........................ G02F 1/1303 |
| 10,675,849 | B2 | 6/2020 | Kim et al. |
| 11,621,313 | B2 | 4/2023 | Lee et al. |
| 11,731,341 | B2 | 8/2023 | Zhang et al. |
| 11,780,123 | B2 | 10/2023 | Taguchi et al. |
| 12,193,315 | B2* | 1/2025 | Wang .................... H10K 77/111 |
| 2002/0185779 | A1 | 12/2002 | Renault et al. |
| 2008/0299352 | A1 | 12/2008 | Matsuda et al. |
| 2010/0176536 | A1 | 7/2010 | Park et al. |
| 2011/0272833 | A1 | 11/2011 | Tsai et al. |
| 2014/0002385 | A1* | 1/2014 | Ka .......................... G06F 3/041 |
| | | | 345/173 |
| 2014/0022747 | A1* | 1/2014 | Calvo Alonso ....... G06F 1/1626 |
| | | | 361/752 |
| 2016/0275830 | A1* | 9/2016 | You ..................... G02F 1/133305 |
| 2016/0339505 | A1 | 11/2016 | Lin et al. |
| 2017/0062756 | A1* | 3/2017 | Ahn ......................... B32B 27/08 |
| 2018/0056638 | A1 | 3/2018 | Choi et al. |
| 2018/0141263 | A1 | 5/2018 | Tian |
| 2018/0214922 | A1 | 8/2018 | Kim et al. |
| 2018/0281251 | A1 | 10/2018 | Seo et al. |
| 2019/0129553 | A1 | 5/2019 | Oh et al. |
| 2019/0162880 | A1 | 5/2019 | Yamamoto et al. |
| 2019/0348641 | A1 | 11/2019 | Jung et al. |
| 2020/0009803 | A1* | 1/2020 | Kang ................ B29C 66/81455 |
| 2020/0012142 | A1 | 1/2020 | Kim et al. |
| 2020/0130251 | A1 | 4/2020 | Wallace |
| 2023/0104677 | A1 | 4/2023 | Ren et al. |
| 2023/0144888 | A1 | 5/2023 | Hirakata et al. |
| 2023/0182460 | A1 | 6/2023 | Kim et al. |
| 2023/0373153 | A1 | 11/2023 | Cho et al. |

FOREIGN PATENT DOCUMENTS

| | | |
|---|---|---|
| JP | 5947766 | 7/2016 |
| KR | 10-2014-0025413 | 3/2014 |
| KR | 1020180056004 A | 5/2018 |
| KR | 10-1893830 | 8/2018 |
| KR | 1020190010680 A | 1/2019 |
| KR | 10-2019-0019259 | 2/2019 |
| KR | 10-2019-0047168 | 5/2019 |

* cited by examiner

METHOD OF MANUFACTURING A DISPLAY DEVICE HAVING A PROTECTIVE FILM

CROSS REFERENCE TO RELATED APPLICATION

This application is a divisional of U.S. patent application Ser. No. 16/854,845, filed on Apr. 21, 2020, which claims priority from and the benefit of Korean Patent Application No. 10-2019-0047751, filed on Apr. 24, 2019, which is hereby incorporated by reference for all purposes as if fully set forth herein.

BACKGROUND

Field

Exemplary implementations of the invention relate generally to display devices and, more specifically, to a protective film for a display device, a method of manufacturing the display device having the same, and a manufacturing apparatus for a bending panel, such as a protective film, which is capable of preventing the protective film from being separated from the display device and improving its reliability.

Discussion of the Background

Recently, various electronic devices, such as a mobile phone, a navigation unit, a digital camera, an e-book, a portable game unit, or various terminals, to which a display device, e.g., a liquid crystal display (LCD) or an organic light emitting diode (OLED) is applied, are being used with increasing frequency.

Further, electronic devices with displays having curved surfaces have been developed and are also being used with increasing frequency.

The above information disclosed in this Background section is only for understanding of the background of the inventive concepts, and, therefore, it may contain information that does not constitute prior art.

SUMMARY

Applicant realized that with the increasing development of electronic devices with displays having curved surfaces, there is a greater need to ensure the durability and reliability of each component having a curved surface such as bending panels (e.g., a protective film) of a display device.

Bending panels for a display device, such as a protective film, constructed according to the principles and exemplary implementations of the invention are capable of being attached to the display panel without separation. For example, according to one of more exemplary embodiments, the protective film is manufactured by an apparatus that bends an outer portion of the protective film before it is coupled to the display panel to reduce the risk of later separation.

Methods of manufacturing the display device according to the principles and exemplary of the invention are capable of preventing a protective film disposed under a display panel from being separated therefrom and improving reliability of the display device.

Additional features of the inventive concepts will be set forth in the description which follows, and in part will be apparent from the description, or may be learned by practice of the inventive concepts.

According to one aspect of the invention, an apparatus for manufacturing a bending panel of a display device includes: a lower mold having a first member on which a target panel is placed, an upper mold disposed adjacent the lower mold and including a second member including a first surface to press a portion of the target panel and a second surface having a first slope with respect to the first surface, and side molds disposed at opposite sides of the lower mold and each having a third member with a third surface complementary to the second surface of the second member. The first slope is smaller than about 90 degrees.

The first member may include a stage having a receiving portion substantially parallel to a plane defined by a first direction and a second direction intersecting the first direction. The side molds may include a pair of first side molds spaced apart from each other in the first direction, and disposed at the opposite sides of the lower mold to press the target panel in the first direction and a pair of second side molds spaced apart from each other in the second direction, and disposed at the both sides of the lower mold to press the target panel in the second direction The upper mold may be spaced apart from the lower mold in a third direction intersecting the first direction and the second direction. The upper mold may be configured to press the target panel in the third direction.

The second member may include an upper pressing member having a cross sectional shape with an area in a plan view that increases as the distance in the third direction from the lower mold decreases.

The second member may include a first pressing portion extending in the first direction, a second pressing portion extending in the second direction, and a third pressing portion disposed between the first pressing portion and the second pressing portion and having a rounded shape.

The lower mold further may include an outer-bending forming portion configured to overlap with the third pressing portion in the plane defined by the first direction and the second direction. The outer-bending forming portion may have a shape complementary to the rounded shape of the third pressing portion.

The third member may include an upper surface supporting an outer portion of the target panel and a side surface to press the target panel and having a second slope with respect to the upper surface. The second slope may be smaller than about 90 degrees.

The first slope and the second slop may be substantially the same.

The upper mold further may include a first portion to move the second member up and down, and the side molds may further include a second portion to move the side pressing member left and right.

The lower mold may further include one or more biasing members disposed under the first member, the one or more biasing members being compressed when the second member presses against the target panel.

The upper mold further may include an upper plate supporting the second member and an upper heater connected to the upper plate and to apply a heat to the upper plate.

The side molds may further include a side plate supporting the third member and a side heater connected to the side plate and to apply heat to the side plate.

According to another aspect of the invention, an apparatus for manufacturing a bending panel includes: a first mold including a first member having a first surface substantially parallel to a plane defined by a first direction and a second direction intersecting the first direction, a second mold spaced apart from the first mold in a third direction intersecting each of the first and second directions and including a first member having a second surface substantially parallel to the first surface and a third surface having a slope with respect to the second surface that is less than about 90 degrees, and a third mold spaced apart from the first mold in the first direction and the second direction and including a second member having a fourth surface complementary to the third surface.

According to still another aspect of the invention, method of manufacturing a display device includes the steps of: coupling a display panel to a first portion of a window member and coupling a protective film to a first portion of the display panel. The step of coupling of the protective film includes the steps of bending both edges of the protective film to an angle of about 90 degrees or more, disposing the bent protective film on the lower portion of the display panel, and coupling the protective film to the display panel.

The step of bending of the both edges of the protective film may include placing the protective film on a support, pressing an upper portion of the protective film to bend the both edges at a first angle, and pressing a side portion bent at the first angle to bend the both edges at a second angle. The second angle greater than the first angle.

An elastic member may be disposed under the support. The step of the pressing of the upper portion of the protective film may include compressing the elastic member.

The step of pressing of the upper portion of the protective film may further include the step of indirectly applying heat to the upper portion of the protective film.

The step of pressing of the side portion of the protective film may further include the step of applying a heat to the side portion of the protective film.

The step of pressing of the side portion of the protective film may be performed by horizontally moving one or more side pressing members or by rotating the one or more side pressing members.

The step of bending of the both edges of the protective film may further include the steps of disposing a release film under the protective film before the placing the protective film on the support and removing the release film before coupling the display panel to the protective film.

The method may further includes the steps of: before the step of coupling of the lower portion of the display panel to the protective film, bending outer portions of the window member and the display panel at a third angle smaller than the second angle at which the protective film is bent.

According to still another aspect of the invention, protective film for a display device includes: a substantially flat portion disposed substantially parallel to a plane defined by a first direction and a second direction intersecting the first direction and a bent portion disposed at a side of the substantially flat portion. The bent portion includes a first bent portion extending in the first direction and a second bent portion extending in the second direction. Each of an angle between the first bent portion and the substantially flat portion and an angle between the second bent portion and the substantially flat portion is less than about 90 degrees.

The bent portion may further include a third bent portion disposed between the first bent portion and the second bent portion.

The third bent portion may be disposed between the first bent portion and the second bent portion and have a rounded shape.

A plurality of slits may be disposed between the first bent portion and the third bent portion and between the second bent portion and the third bent portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1A:
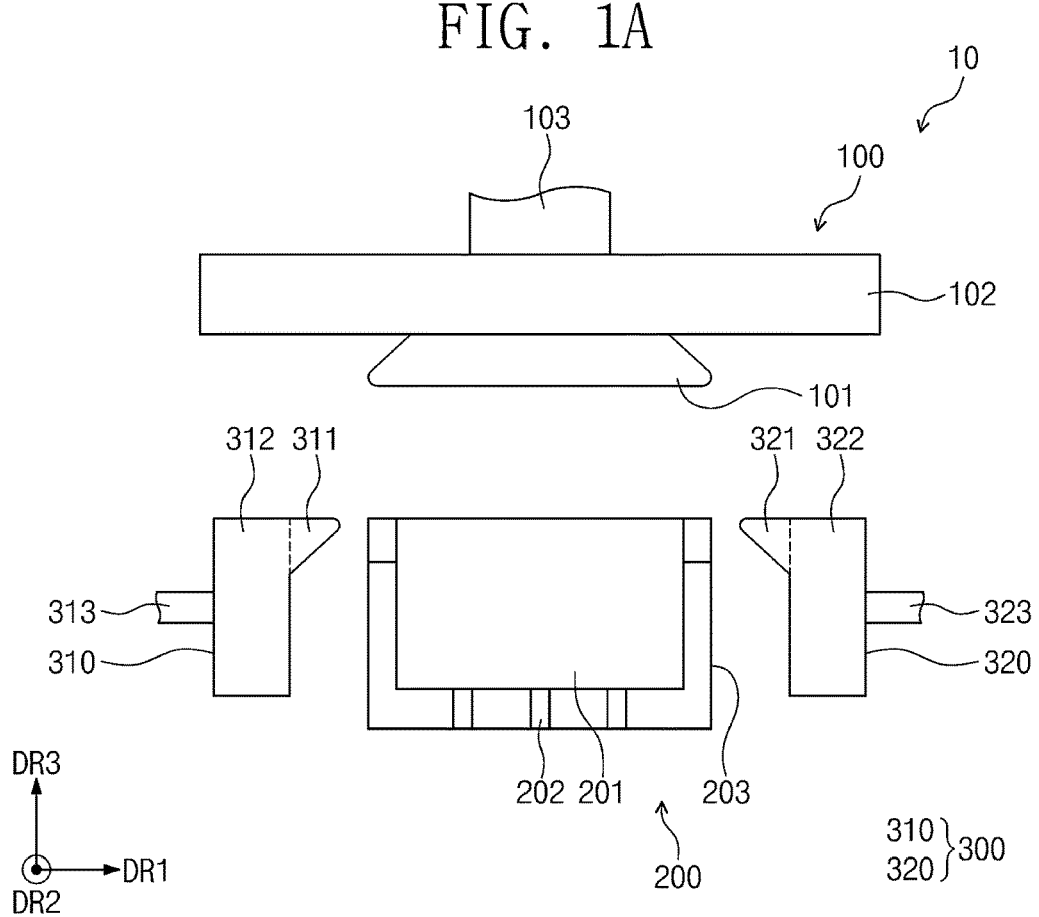
FIG. 1A is a cross-sectional view of an exemplary embodiment of a bending panel manufacturing apparatus constructed according to the principles of the invention taken in a first direction.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1B:
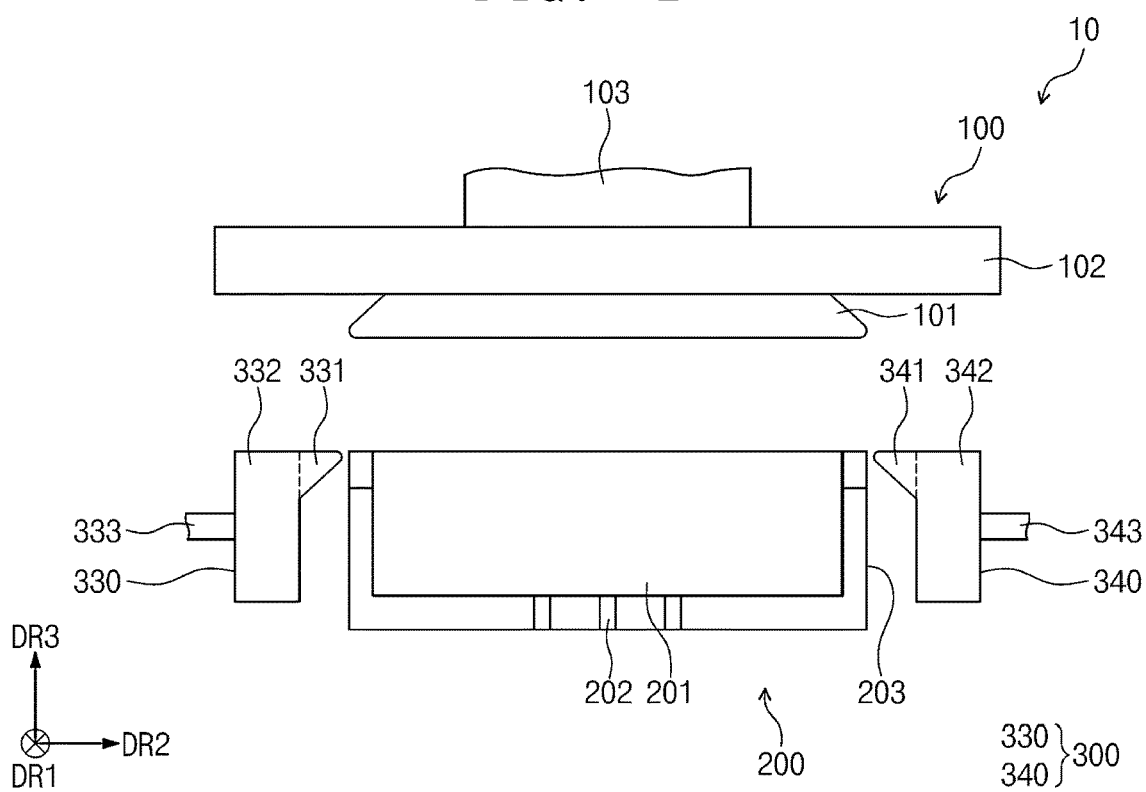
FIG. 1B is a cross-sectional view of the bending panel manufacturing apparatus of FIG. 1A taken in a second direction normal to the first direction.

FIG. 1A is a cross-sectional view of an exemplary embodiment of a bending panel manufacturing apparatus 10 constructed according to the principles of the invention taken in a first direction. FIG. 1B is a cross-sectional view of the bending panel manufacturing apparatus 10 of FIG. 1A taken in a second direction normal to the first direction. FIG. 1A shows a cross-section substantially parallel to a plane defined by a first direction DR1 and a third direction DR3 in the bending panel manufacturing apparatus 10. FIG. 1B shows a cross-section substantially parallel to a plane defined by a second direction DR2 and the third direction DR3 in the bending panel manufacturing apparatus 10, which is normal to the first direction.

In describing the bending panel manufacturing apparatus 10 with reference to FIGS. 1A and 1B, the vertical direction of the bending panel manufacturing apparatus 10 is indicated by the third direction DR3. However, directions indicated by the first, second, and third directions DR1, DR2, and DR3 are relative to each other, and thus the directions indicated by the first, second, and third directions DR1, DR2, and DR3 may be changed to other directions. In the following descriptions, an expression "when viewed in a plan view" means the case of being viewed in the third direction DR3. In addition, the term "thickness direction" means the third direction DR3.

Referring to FIGS. 1A and 1B, the bending panel manufacturing apparatus 10 includes an upper mold 100, a lower mold 200, and a side mold 300.

The upper mold 100 includes an upper pressing member 101, an upper plate 102, and a first moving unit (e.g. a portion of a motor) 103. The upper mold 100 is disposed above the lower mold 200.

The upper pressing member 101 is connected to the upper plate 102 to perform the function of pressing a target panel that is placed on the bending panel manufacturing apparatus 10 to form the panel into a desired shape. In the exemplary embodiment, the target panel is a bending panel such as the protective film 1000 shown in FIG. 8A, but is not limited thereto. For example, the target panel may be any panel, film or other component of the display device having a curved, bent or rounded shape. The upper pressing member 101 is disposed to correspond to an upper portion of a stage 201 of the lower mold 200. The upper pressing member 101 may include various materials without limitation as long as the materials are suitable to thermoform the target panel using a heat transmitted from the upper plate 102. For example, the upper pressing member 101 may include a porous material such as silicon carbide. As another example, the upper pressing member 101 may include a metal material.

The upper plate 102 is connected to the upper pressing member 101 and transmits the heat from a heater (described subsequently) to the upper pressing member 101. In addition, the upper plate 102 performs the function of fixing the positional relationship of respective components included in the upper mold 100, such as the upper pressing member 101. The upper plate 102 includes a metal material with high thermal conductivity to transmit the heat applied thereto to the upper pressing member 101.

The first moving unit 103 is connected to the upper plate 102 to move the upper mold 100 in upper and lower directions. In detail, the first moving unit 103 moves the upper plate 102 connected thereto upward and downward along the third direction DR3 to allow the upper pressing member 101 connected to the upper plate 102 to move up and down. Accordingly, the upper pressing member 101 presses the target panel, which is placed on the stage 201 of the lower mold 200 disposed under the upper pressing member 101, downward.

The lower mold 200 includes the stage 201, an elastic member 202, and a body unit 203. The lower mold 200 is disposed under the upper mold 100. The lower mold 200 is spaced apart from the upper mold 100 in the third direction DR3.

The stage 201 supports the target panel placed thereon. The stage 201 provides a flat surface 201-US (refer to FIG. 3B) substantially parallel to the first direction DR1 and the second direction DR2 to allow the target panel to be disposed substantially parallel to the first direction DR1 and the second direction DR2 on the flat surface 201-US. The flat surface 201-US defined at the top of the stage 201 may be a receiving portion on which the target panel is disposed. When the upper pressing member 101 moves downward and presses the target panel, the stage 201 moves downward.

The elastic member 202 is disposed under the stage 201 and provides a predetermined elastic force to an upward direction of the stage 201. As the upper pressing member 101 applies the pressure downward to the target panel placed on the stage 201, the elastic member 202 is compressed. The elastic member 202 may be implemented in various ways as long as the elastic member 202 provides the elastic force in the upward direction of the stage 201. For example, the elastic member 202 may be, but is not limited to, one of more springs.

The body unit 203 accommodates the stage 201 and the elastic member 202 therein and fixes the stage 201 such that the stage 201 moves up and down without being misaligned when being pressed by the upper pressing member 101. The body unit 203 further includes an outer-bending forming portion (213, refer to FIGS. 3A and 3B) that forms a bending shape at an outer portion of the target panel.

The side mold 300 is disposed at both sides of the lower mold 200. The side mold 300 includes a pair of first side molds 310 and 320 spaced apart from each other in the first direction DR1 and extending in the second direction DR2 shown in FIG. 1A and a pair of second side molds 330 and 340 spaced apart from each other in the second direction DR2 and extending in the first direction DR1 shown in FIG. 1B. The pair of first side molds 310 and 320 spaced apart from each other in the first direction DR1 and disposed at a first set of opposite sides of the lower mold 200. The pair of second side molds 330 and 340 spaced apart from each other in the second direction DR2 and disposed at a second set of opposite sides of the lower mold 200.

The pair of first side molds 310 and 320, and the pair of second side molds 330 and 340 include respective side pressing members 311, 321, 331, and 341, respective side plates 312, 322, 332, and 342, and respective second moving units 313, 323, 333, and 343. The side pressing members 311, 321, 331, and 341 are connected to the side plates 312, 322, 332, and 342 and secondarily press the placed target panel. In detail, the side pressing members 311, 321, 331, and 341 secondarily press the target panel that is bent by being primarily pressed by the upper pressing member 101. The side pressing members 311 and 321 of the pair of first side molds 310 and 320 press the target panel in the first direction DR1, and the side pressing members 331 and 341 of the pair of second side molds 330 and 340 press the target panel in the second direction DR2.

Figure 4A:
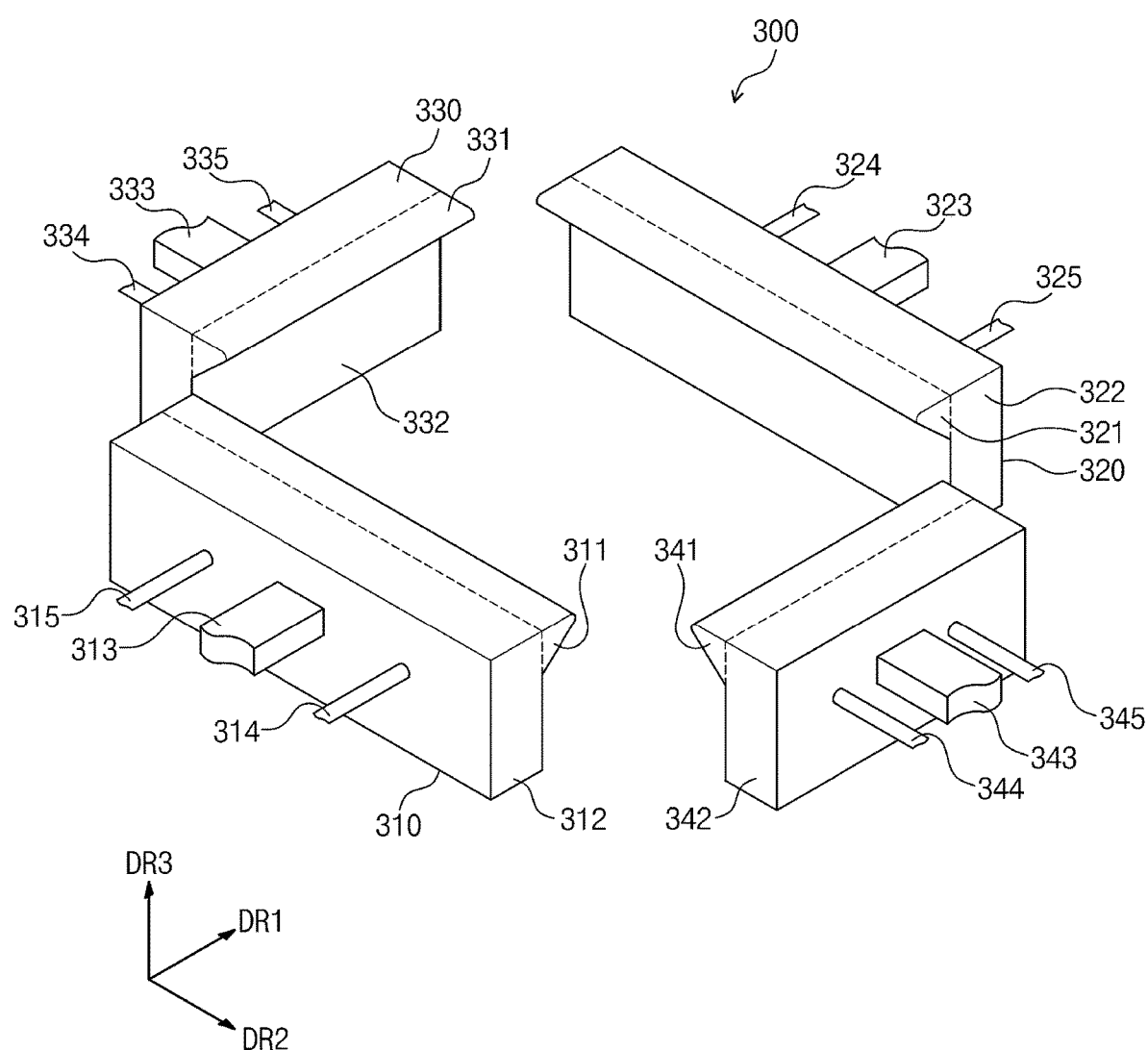
FIG. 4A is a perspective view of an exemplary embodiment of a side mold of the bending panel manufacturing apparatus of FIG. 1A.

The side pressing members 311, 321, 331, and 341 are respectively connected to the side plates 312, 322, 332, and 342, and the side plates 312, 322, 332, and 342 transmit the heat from the heater 314, 324, 334, and 344 shown in FIG. 4A to the side pressing members 311, 321, 331, and 341. The side plates 312, 322, 332, and 342 fix the positional between components included in the side mold 300, e.g., the side pressing members 311, 321, 331, and 341. The side plates 312, 322, 332, and 342 include a metal material with high thermal conductivity to transmit the heat applied thereto to the side pressing members 311, 321, 331, and 341.

The second moving units 313, 323, 333, and 343 are connected to the side plates 312, 322, 332, and 342 and move the side mold 300 in the first direction DR1 and the second direction DR2. In detail, the second moving units 313, 323, 333, and 343 move the side plates 312, 322, 332, and 342, which are connected thereto, left and right along the first direction DR1 and the second direction DR2 to allow the side pressing members 311, 321, 331, and 341 connected to the side plates 312, 322, 332, and 342 to move left and right. Therefore, the side pressing members 311, 321, 331, and 341 press the target panel placed on the stage 201 of the lower mold 200 disposed between the pair of first side molds 310 and 320, and between the pair of second side molds 330 and 340 toward the center of the bending panel manufacturing apparatus.

FIGS. 1A and 1B show a representative example of the upper mold 100 that moves downward along the third direction DR3 by the operation of the first moving unit 103 and primarily presses the target panel, however, it should not be limited thereto or thereby. That is, a moving unit like the first moving unit 103 may be included in the lower mold 200 and the side mold 300. In this case, an operation of primarily pressing the target panel may be performed by moving the lower mold 200 and the side mold 300 upward along the third direction DR3 by the moving unit connected to the lower mold 200 and the side mold 300.

Hereinafter, each component included in the bending panel manufacturing apparatus 10 according to the exemplary embodiment will be described in detail with reference to individual figures.

Figure 2A:
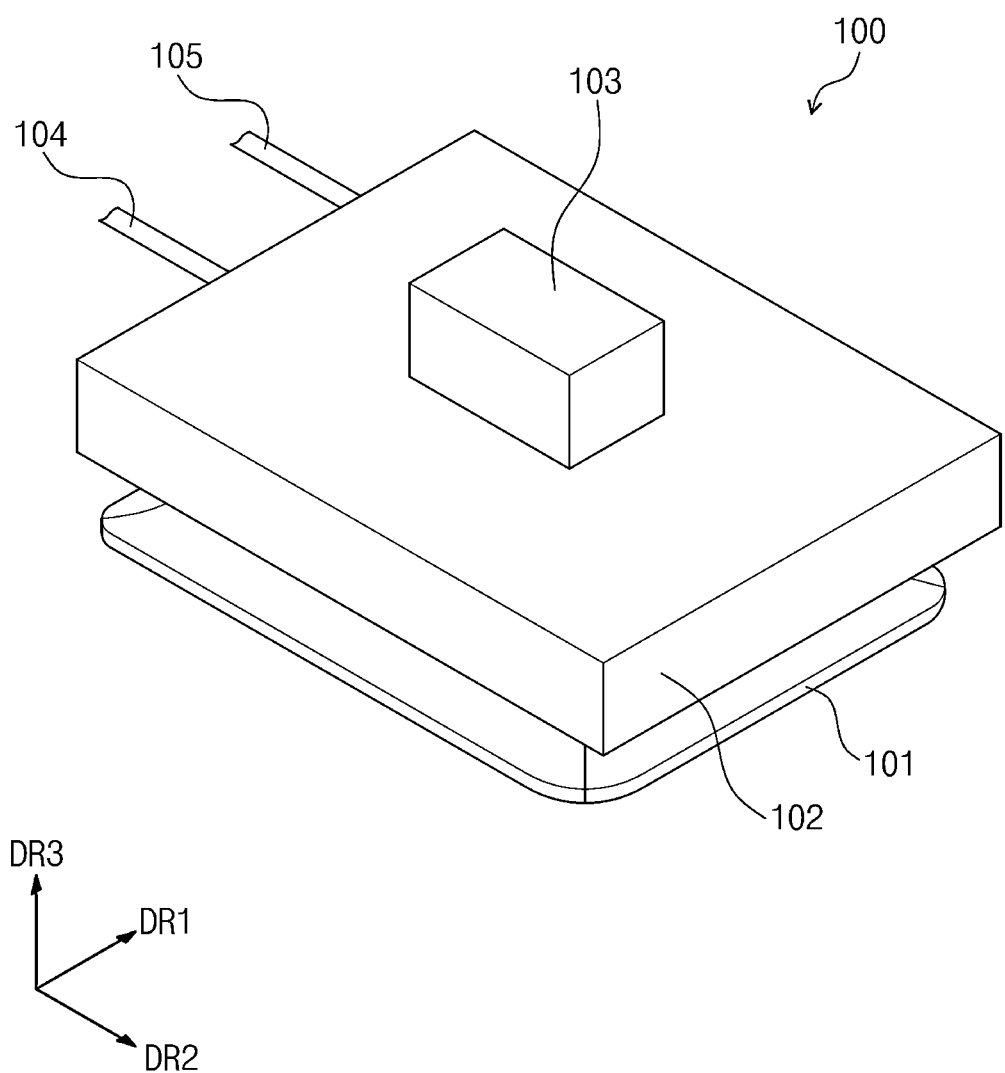
FIG. 2A is a combined perspective view of an exemplary embodiment of an upper mold of the bending panel manufacturing apparatus of FIG. 1A.
Figure 2B:
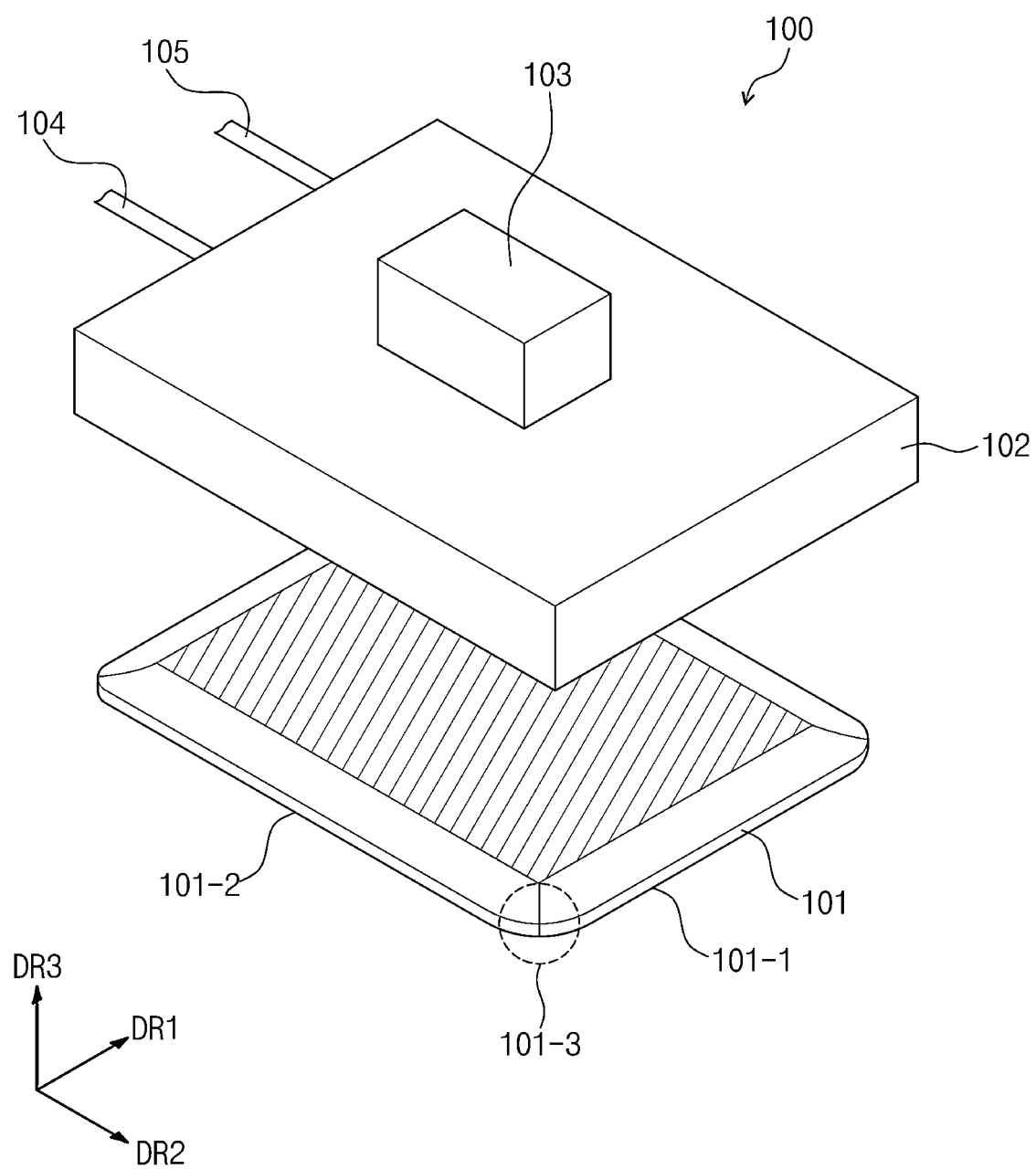
FIG. 2B is an exploded perspective view of an exemplary embodiment of the upper mold of the bending panel manufacturing apparatus of FIG. 1A.
Figure 2C:
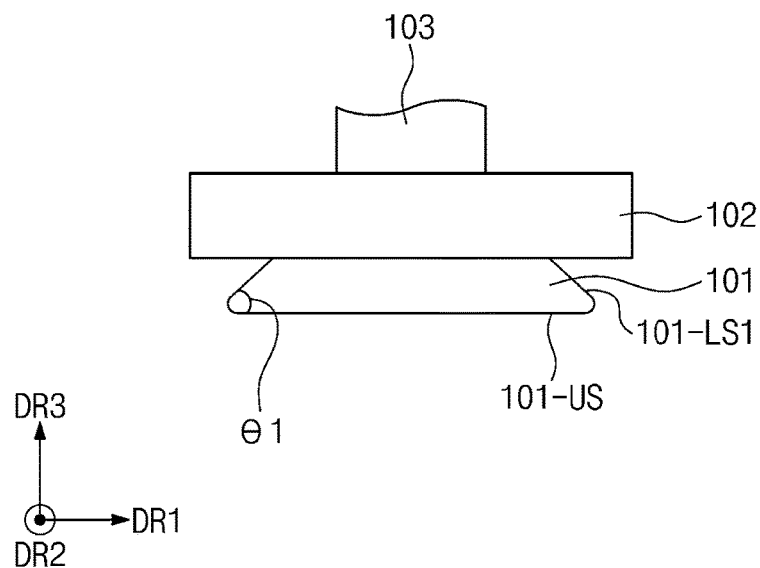
FIG. 2C is a front view of an exemplary embodiment of the upper mold of the bending panel manufacturing apparatus of FIG. 1A.
Figure 2D:
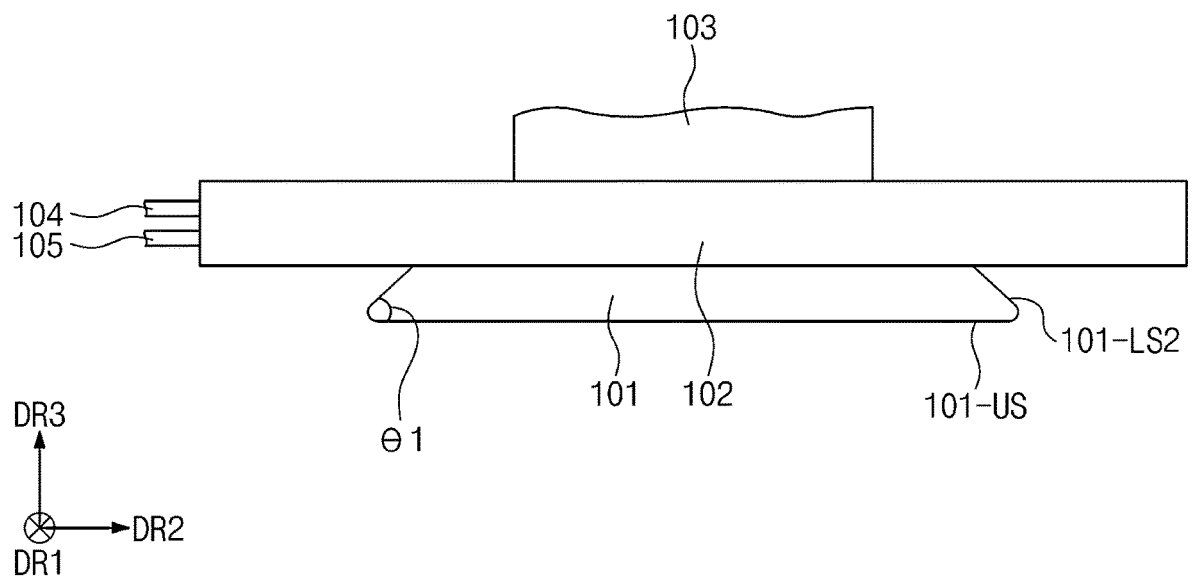
FIG. 2D is a side view of an exemplary embodiment of the upper mold of the bending panel manufacturing apparatus of FIG. 1A.

FIG. 2A is a combined perspective view of an exemplary embodiment of the upper mold 100 of the bending panel manufacturing apparatus of FIG. 1A. FIG. 2B is an exploded perspective view of an exemplary embodiment of the upper mold 100 of the bending panel manufacturing apparatus of FIG. 1A. FIG. 2C is a front view of an exemplary embodiment of the upper mold 100 of the bending panel manufacturing apparatus of FIG. 1. FIG. 2D is a side view of an exemplary embodiment of the upper mold 100 of the bending panel manufacturing apparatus of FIG. 1A.

Referring to FIGS. 2A to 2D, the upper mold 100 according to the exemplary embodiment may include the upper pressing member 101, the upper plate 102, the first moving unit 103, an upper heating heater 104, and an upper temperature sensor 105.

The upper pressing member 101 is connected to the upper plate 102 and has a shape in which an area on a plane defined by the first direction DR1 and the second direction DR2 increases as the upper pressing member 101 gets closer to the lower mold 200 along the third direction DR3. The upper pressing member 101 may have a trapezoidal shape in cross section. The upper pressing member 101 may have an inverted tapered shape.

The upper pressing member 101 may include a first pressing portion 101-1, a second pressing portion 101-2, and a third pressing portion 101-3. The first pressing portion 101-1 may extend in the first direction DR1 and may press both ends of the target panel, which are spaced apart from each other in the second direction DR2. The second pressing portion 101-2 may extend in the second direction DR2 and may press both ends of the target panel, which are spaced apart from each other in the first direction DR1. The third pressing portion 101-3 may be defined between the first pressing portion 101-1 and the second pressing portion 101-2 and may have a round shape. The third pressing portion 101-3 may press a portion corresponding to a vertex of the target panel and may bend the portion in the round shape.

The upper pressing member 101 includes a lower surface 101-US and a side surface 101-LS1, 101-LS2. The lower surface 101-US of the upper pressing member 101 may be a surface that substantially presses the upper portion of the target panel. The side surface 101-LS1, 101-LS2 of the upper pressing member 101 may have a first slope with respect to the lower surface 101-US of the upper pressing member 101. The side surface 101-LS1, 101-LS2 of the upper pressing member 101 may have the first slope inclined by a first angle θ1 with respect to the lower surface 101-US of the upper pressing member 101. The first angle θ1 may be an acute angle. That is, the first angle θ1 may be smaller than about 90 degrees.

The upper plate 102 may be connected to the upper pressing member 101, the first moving unit 103, the upper heating heater 104, and the upper temperature sensor 105, which are included in the upper mold 100, to determine the positional relationship between them.

The first moving unit 103 may be disposed on the upper plate 102 and may move the upper mold 100 up and down along the third direction DR3. The first moving unit 103 may move the upper mold 100 up and down along the third direction DR3 using a pneumatic or hydraulic cylinder or other means known in the art. As another way, the first moving unit 103 may move the upper mold 100 up and down along the third direction DR3 using a mechanical cylinder.

The upper heating heater 104 may be connected to the upper plate 102 and may apply the heat to the upper plate 102 such that the upper pressing member 101 thermoforms the target panel using the heat applied thereto. When the upper heating heater 104 applies the heat to the upper plate 102, the heat may be adjusted to a temperature suitable for thermoforming the target panel by the upper temperature sensor 105 connected to the upper plate 102.

The upper mold 100 may further include a guide pin for the alignment with the lower mold when pressing the target panel.

In FIGS. 2A to 2D, the components included in the upper mold 100 have separate components, however, they should not be limited thereto or thereby. That is, some components among the components included in the upper mold 100 may have a single unitary form. For example, the upper pressing member 101 may have a shape integrally provided with the upper plate 102.

Figure 3A:
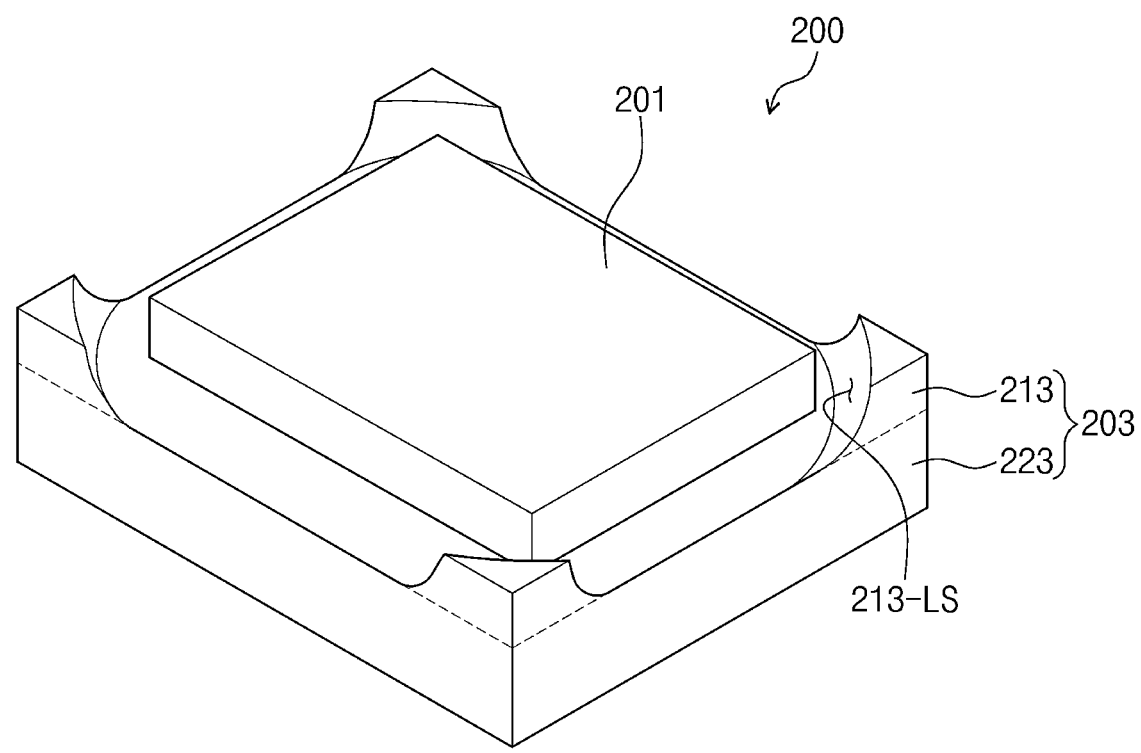
FIG. 3A is a combined perspective view of an exemplary embodiment of a lower mold of the bending panel manufacturing apparatus of FIG. 1A.
Figure 3B:
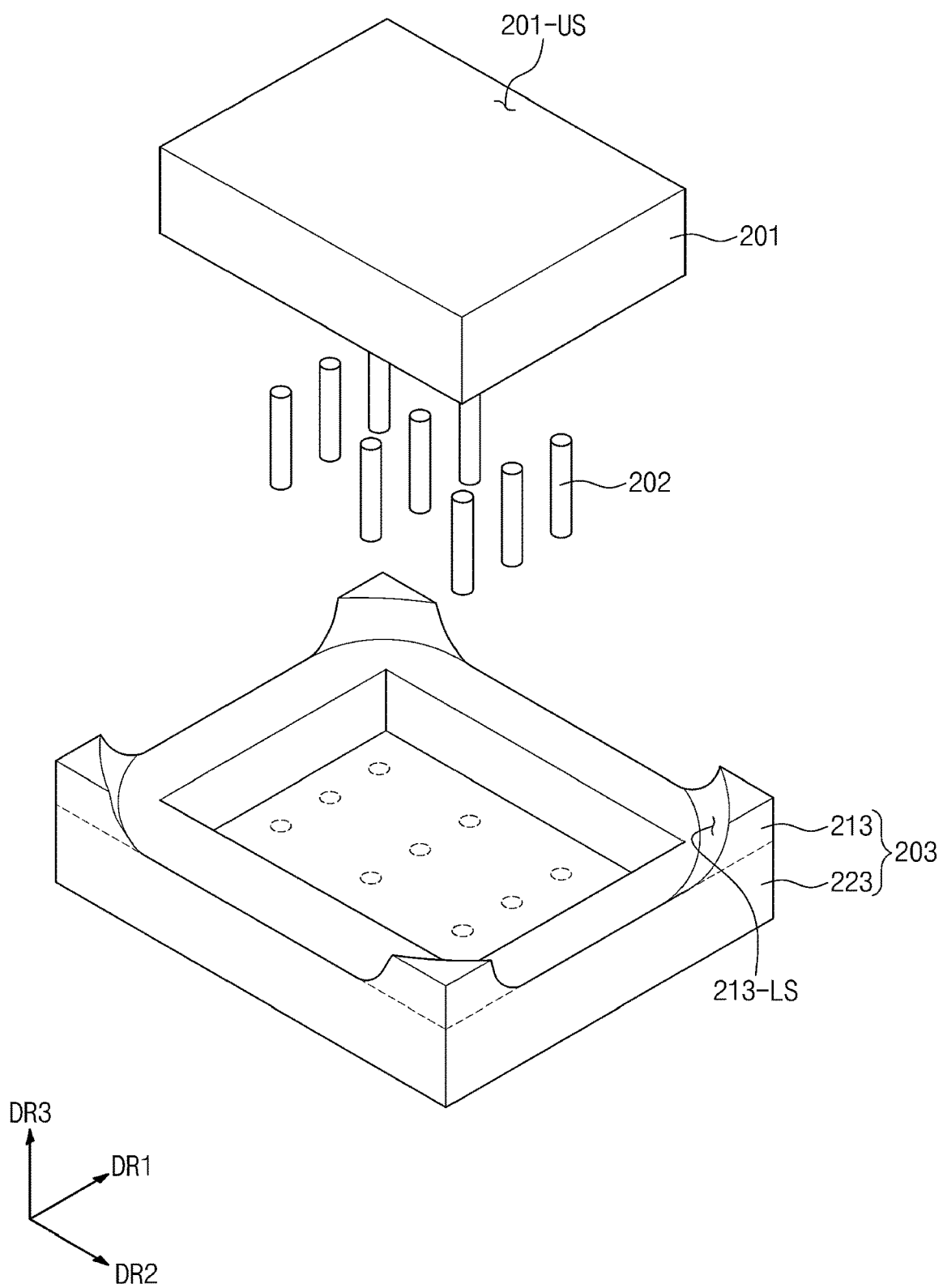
FIG. 3B is an exploded perspective view of an exemplary embodiment of the lower mold of the bending panel manufacturing apparatus of FIG. 1A.
Figure 3C:
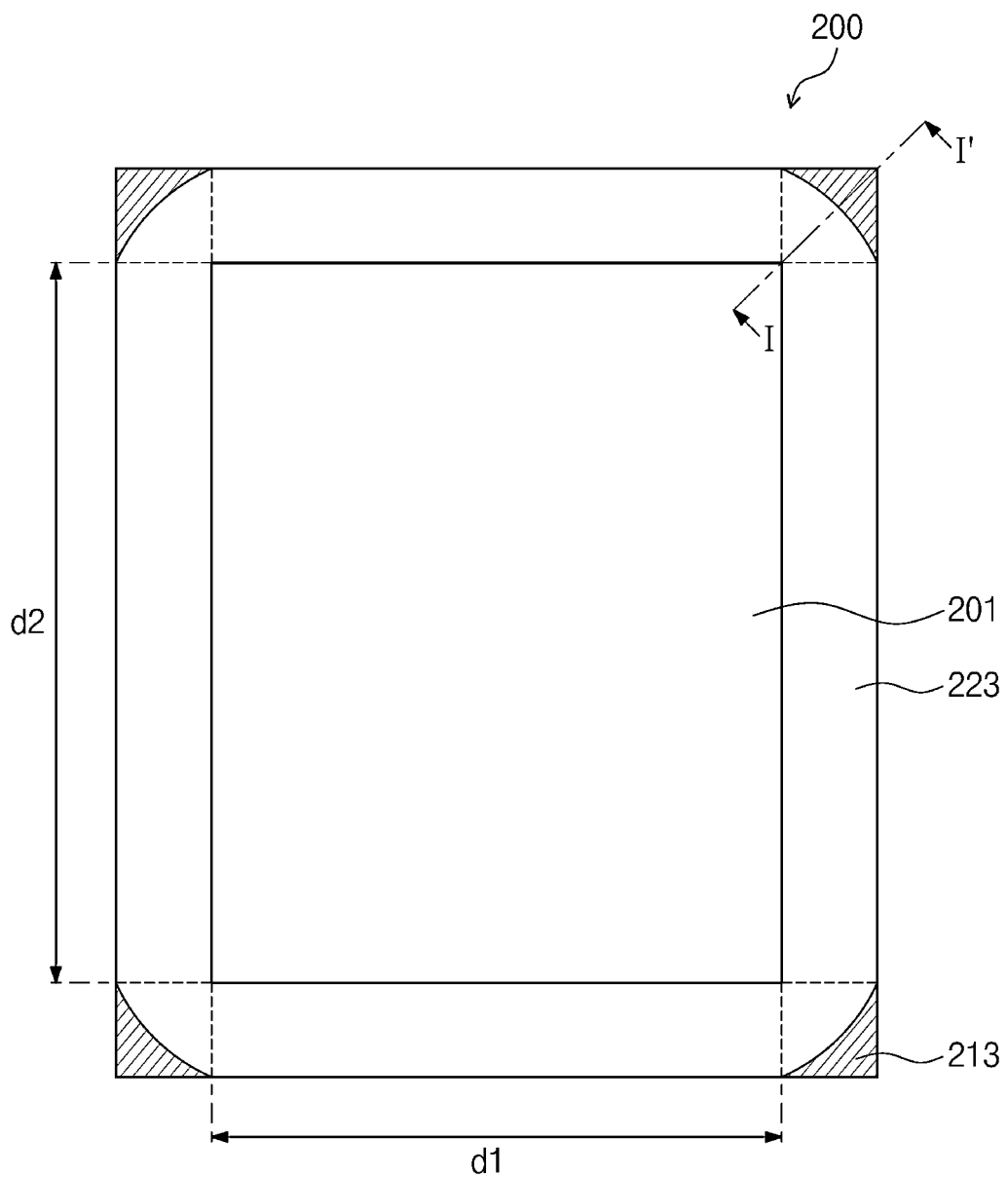
FIG. 3C is a top view of an exemplary embodiment of the lower mold of the bending panel manufacturing apparatus of FIG. 1A.

FIG. 3A is a combined perspective view of an exemplary embodiment of the lower mold 200 of the bending panel manufacturing apparatus of FIG. 1A. FIG. 3B is an exploded perspective view of an exemplary embodiment of the lower mold 200 of the bending panel manufacturing apparatus of FIG. 1A. FIG. 3C is a top view of an exemplary embodiment of the lower mold 200 of the bending panel manufacturing apparatus of FIG. 1A.

Referring to FIGS. 3A to 3C, the lower mold 200 may include the stage 201, the elastic member 202, and the body unit 203.

The stage 201 is disposed at a center of the body unit 203. In FIGS. 3A and 3B, the stage 201 is shown as being a rectangular parallelepiped shape, however, the shape of the stage 201 should not be limited thereto or thereby. That is, the stage 201 may have various shapes, each providing a surface, such as planar, on which the target panel may be placed. The stage 201 may have a rectangular shape on a plane defined by the first direction DR1 and the second direction DR2. The stage 201 may have a first length d1 in the first direction DR1 and a second length d2 in the second direction DR2.

The elastic member 202 is disposed under the stage 201 and provides the elastic force to the stage 201 in the upward direction along the third direction DR3. The elastic member 202 may be one or more springs. In FIG. 3B, the lower mold 200 includes nine elastic members 202 as a representative example, however, the number of the elastic members 202 should not be limited to nine. The number, shape, and arrangement relationship of the elastic members 202 may be appropriately selected depending on the type of the elastic member 202 and the magnitude of the pressure applied to the stage 201.

The body unit 203 may include the outer-bending forming portion 213 and a fixing portion 223. The outer-bending forming portion 213 is disposed at a vertex on the plane of the body portion 203 and includes inner surface 213-LS having a rounded or curved shape. The inner surface 213-LS of the outer-bending forming portion 213 may have a shape corresponding to the shape of the third pressing portion 101-3 of the upper mold 100 described above. In FIGS. 3A and 3B, the outer-bending forming portion 213 and the fixing portion 223 may have a single unitary form, however, the outer-bending forming portion 213 and the fixing portion 223 may be separate components having independent shapes.

The stage 201 and the elastic member 202 are placed on the fixing portion 223, and the fixing portion 223 holds the stage 201 to move up and down along the third direction DR3 without being misaligned when the stage 201 is pressed by the upper pressing member 101. A predetermined inner space is defined in a center of the fixing portion 223, and the stage 201 and the elastic member 202 are placed in the predetermined inner space.

The lower mold 200 may further include a guide bush for the alignment with the upper mold when the target panel is pressed by the upper mold 100 described above.

Figure 4B:
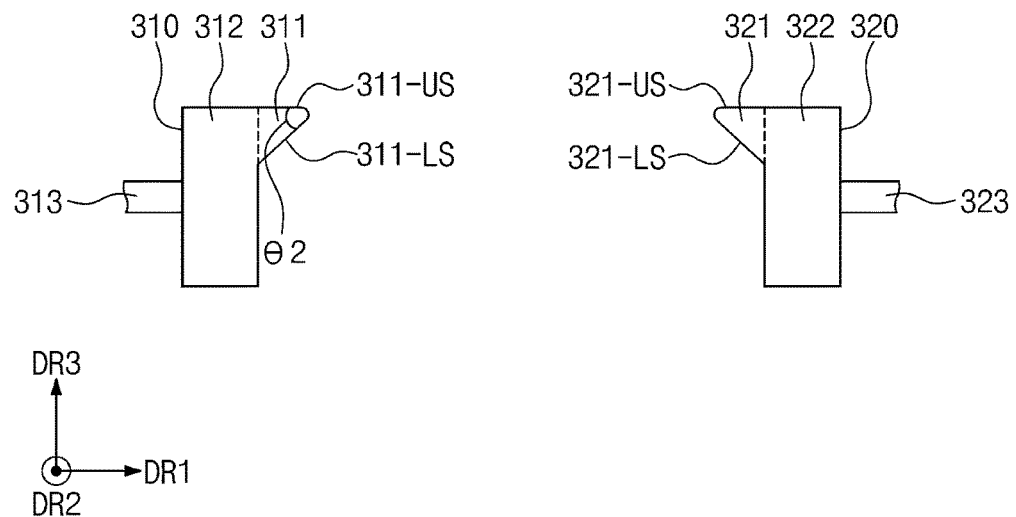
FIG. 4B is a front view of an exemplary embodiment of the side mold of the bending panel manufacturing apparatus of FIG. 1A.
Figure 4C:
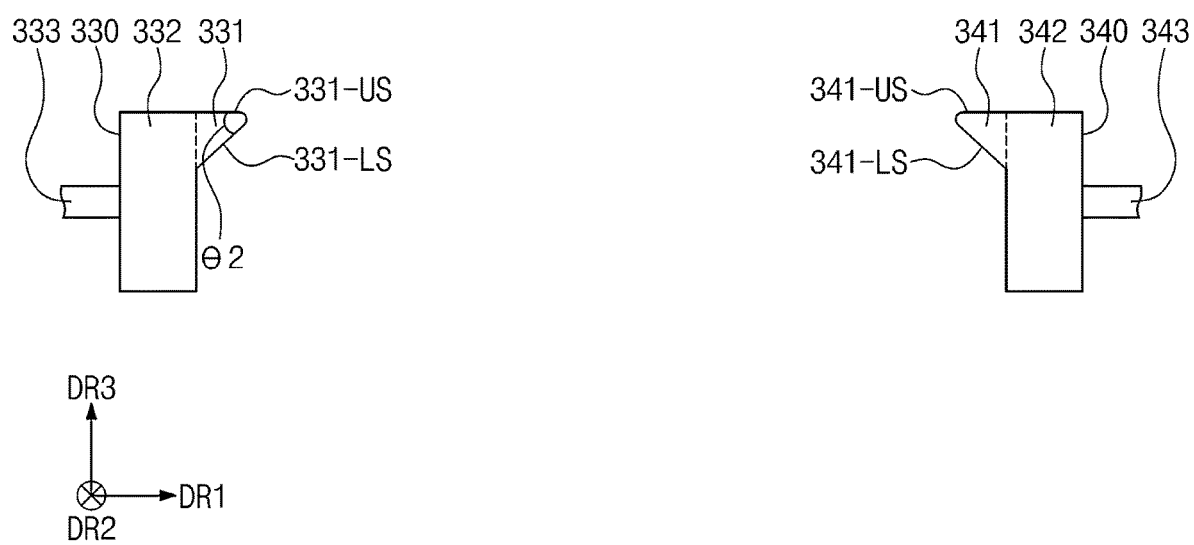
FIG. 4C is a side view of an exemplary embodiment of the side mold of the bending panel manufacturing of FIG. 1A.
Figure 4D:
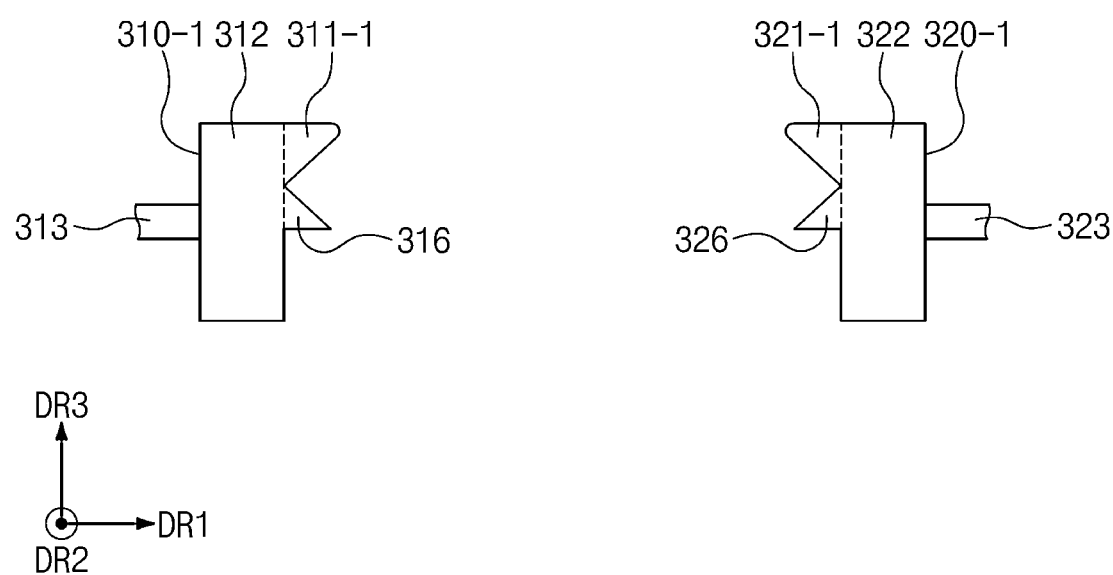
FIG. 4D is a front view of an exemplary embodiment of a side mold of a bending panel manufacturing apparatus of FIG. 1A.

FIG. 4A is a perspective view of an exemplary embodiment of the side mold 300 of the bending panel manufacturing apparatus of FIG. 1A. FIG. 4B is a front view of an exemplary embodiment of the side mold 300 of the bending panel manufacturing apparatus of FIG. 1A. FIG. 4C is a side view of an exemplary embodiment of the side mold 300 of the bending panel manufacturing apparatus of FIG. 1A. FIG. 4D is a front view of an exemplary embodiment of a side mold of a bending panel manufacturing apparatus of FIG. 1A.

Referring to FIGS. 4A to 4C, the side mold 300 includes a pair of the first side molds 310 and 320 spaced apart from each other in the first direction DR1 and extending in the second direction DR2 and a pair of the second side molds 330 and 340 spaced apart from each other in the second direction DR2 and extending in the first direction DR1. The first side molds 310 and 320 are spaced apart from each other in the first direction DR1. The second side molds 330 and 340 are spaced apart from each other in the second direction DR2.

The pair of first side molds 310 and 320, and the pair of second side molds 330 and 340 include the respective side pressing members 311, 321, 331, and 341, the respective side plates 312, 322, 332, and 342, the respective second moving units 313, 323, 333, and 343, respective side heating heaters 314, 324, 334, and 344, and respective side temperature sensors 315, 325, 335, and 345.

The side pressing members 311, 321, 331, and 341 may be respectively connected to one ends of the side plates 312, 322, 332, and 342 and may have a cross-sectional shape that decreases in a direction away from the side plates 312, 322, 332, and 342. The cross-sectional shape of the side pressing members 311 and 321 of the first side molds 310 and 320 decreases in a direction away from the side plates 312 and 322 in the first direction DR1. The cross-sectional shape of the side pressing members 331 and 341 of the second side molds 330 and 340 decreases in a direction away from the side plates 332 and 342 in the second direction DR2.

The side pressing members 311, 321, 331, and 341 may respectively include upper surfaces 311-US, 321-US, 331-US, and 341-US and may respectively include side surfaces 311-LS, 321-LS, 331-LS, and 341-LS. The upper surfaces 311-US, 321-US, 331-US, and 341-US of the side pressing members 311, 321, 331, and 341 may support an outer portion of the target panel when the target panel is placed on the stage. The side surfaces 311-LS, 321-LS, 331-LS, and 341-LS of the side pressing members 311, 321, 331, and 341 may be surfaces that substantially press the target panel as the side mold 300 moves.

The side surfaces 311-LS, 321-LS, 331-LS, and 341-LS of the side pressing members 311, 321, 331, and 341 may be inclined at a second slope with respect to the upper surfaces 311-US, 321-US, 331-US, and 341-US. The side surfaces 311-LS, 321-LS, 331-LS, and 341-LS of the side pressing members 311, 321, 331, and 341 may have the second slope inclined by a second angle θ2 with respect to the upper surfaces 311-US, 321-US, 331-US, and 341-US. The second angle θ2 may be an acute angle. That is, the second angle θ2 may be smaller than about 90 degrees.

The second slope may be substantially the same as the first slope of the upper pressing member. That is, the second angle θ2 may be the same as the first angle θ1 (refer to FIG. 3C) between the side surface and the lower surface of the upper pressing member. The side pressing members 311, 321, 331, and 341 may have the shape corresponding to that of the upper pressing member. The side surfaces 311-LS, 321-LS, 331-LS, and 341-LS of the side pressing members 311, 321, 331, and 341 may be substantially parallel to the side surface 101-LS1, 101-LS2 of the upper pressing member.

The side plates 312, 322, 332, and 342 may perform a function of fixing the positional relationships between the components included in the side mold 300, e.g., the side pressing members 311, 321, 331, and 341, the second moving units 313, 323, 333, and 343, the side heating heaters 314, 324, 334, and 344, and the side temperature sensors 315, 325, 335, and 345. In FIGS. 4A to 4C, the side pressing members 311, 321, 331, and 341 may be provided integrally with the side plates 312, 322, 332, and 342, however, the side pressing members 311, 321, 331, and 341 may be separated formed from the side plates 312, 322, 332, and 343 to have independent shapes.

The second moving units 313, 323, 333, and 343 may be disposed outside of the side plates 312, 322, 332, and 342 and may move the side mold 300 left and right along the first direction DR1 or the second direction DR2. The second moving units 313, 323, 333, and 343 may move the side mold 300 left and right along the first direction DR1 or the second direction DR2 using a pneumatic or hydraulic cylinder, or other known means. As another way, the second moving units 313, 323, 333, and 343 may move the side mold 300 left and right along the first direction DR1 or the second direction DR2 using a mechanical cylinder.

The side heating heaters 314, 324, 334, and 344 may be connected to the side plates 312, 322, 332, and 342 and may apply heat to the side plates 312, 322, 332, and 342 such that the side pressing members 311, 321, 331, and 341 thermoforms the target panel using the heat applied thereto. When the side heating heaters 314, 324, 334, and 344 apply heat to the side plates 312, 322, 332, and 342, the side temperature sensors 315, 325, 335, and 345 connected to the side plates 312, 322, 332, and 342 may adjust the temperature to be suitable for thermoforming the target panel.

Referring to FIG. 4D, side molds 310-1 and 320-1 may further include auxiliary pressing members 316 and 326. The auxiliary pressing members 316 and 326 may be disposed under side pressing members 311-1 and 321-1 and may be connected to side plates 312 and 322. As the side molds 310-1 and 320-1 include the auxiliary pressing members 316 and 326, the target panel may be prevented from sagging downward when the side molds 310-1 and 320-1 move in the first direction DR1 and press the target panel. In addition, an upper mold and the side molds 310-1 and 320-1 may be engaged with each other due to the shape of the auxiliary pressing members 316 and 326 when the target panel is pressed.

Figure 5:
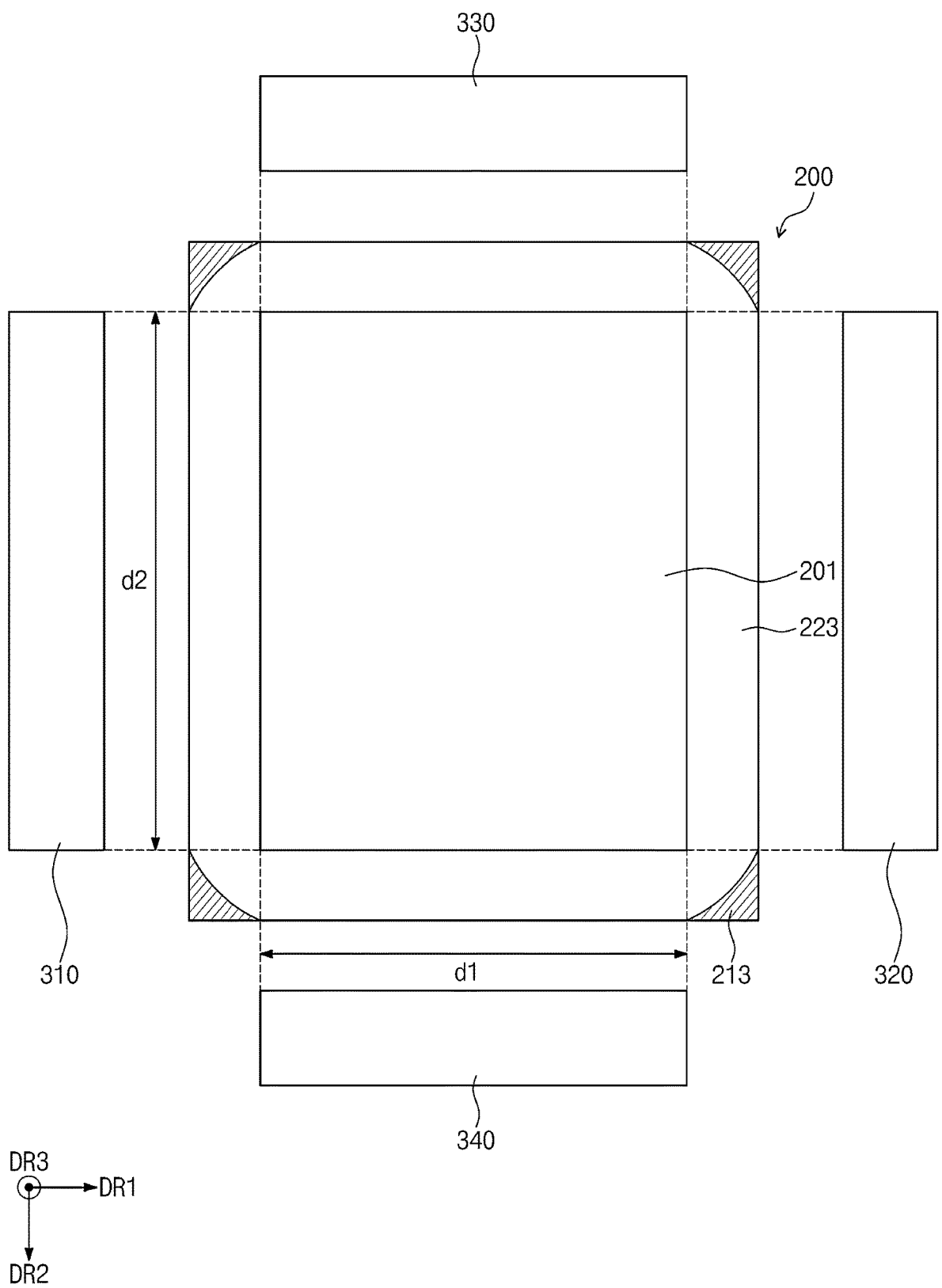
FIG. 5 is a top view of an exemplary embodiment of some components of a bending panel manufacturing apparatus of FIG. 1A.

FIG. 5 is a top view of an exemplary embodiment of some components of the bending panel manufacturing apparatus of FIG. 1A. FIG. 5 schematically shows the lower mold 200 and the side molds 310, 320, 330, and 340 of the bending panel manufacturing apparatus of FIG. 1.

Referring to FIG. 5, the side molds 310, 320, 330, and 340 of the bending panel manufacturing apparatus may be disposed to correspond to edges of the lower mold 200. The first side molds 310 and 320 may be disposed with the lower mold 200 interposed therebetween to be spaced apart from each other in the first direction DR1 and may extend in the second direction DR2. The second side molds 330 and 340 may be disposed with the lower mold 200 interposed therebetween to be spaced apart from each other in the second direction DR2 and may extend in the first direction DR1.

The longitudinal lengths of the side molds 310, 320, 330, and 340 may respectively correspond to length of the edges of the stage 201 of the lower mold 200. The first side molds 310 and 320 may extend in the second direction DR2 by the same length as the second length d2 that is the length of the edge in the second direction DR2 of the stage 201. The second side molds 330 and 340 may extend in the first direction DR1 by the same length as the first length d1 that is the length of the edge in the first direction DR1 of the stage 201.

Figure 6A:
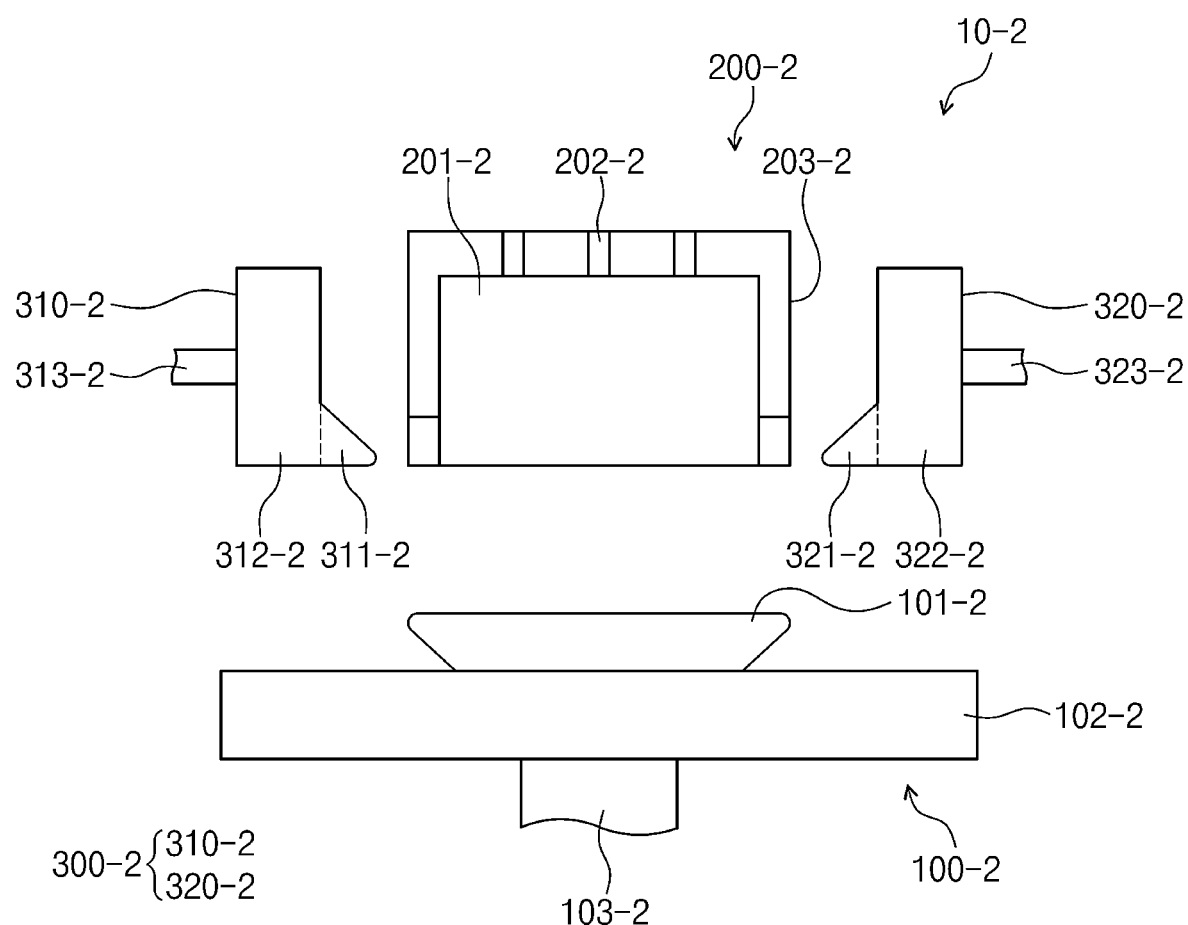
FIG. 6A is a cross-sectional view of another exemplary embodiment of a bending panel manufacturing apparatus constructed according to the principles of the invention in a first direction.
Figure 6A:
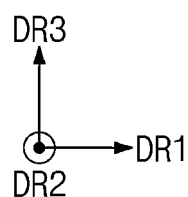
Figure 6B:
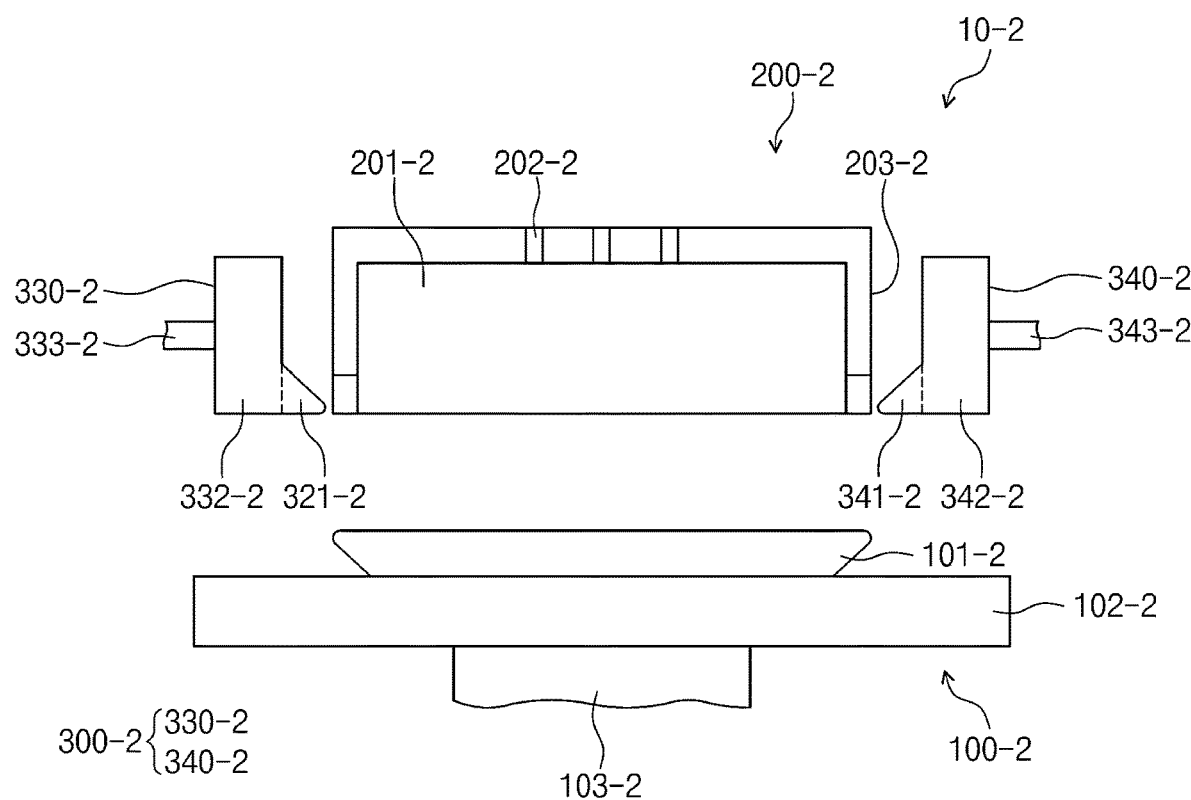
FIG. 6B is a cross-sectional view of the bending panel manufacturing apparatus of FIG. 6A taken in a second direction normal to the first direction

FIG. 6A is a cross-sectional view of another exemplary embodiment of a bending panel manufacturing apparatus 10-2 constructed according to the principles of the invention in a first direction. FIG. 6B is a cross-sectional view of the bending panel manufacturing apparatus 10-2 of FIG. 6A taken in a second direction normal to the first direction. Hereinafter, different features of the bending panel manufacturing apparatus 10-2 from the bending panel manufacturing apparatus 10 shown in FIGS. 1A and 1B will be mainly described.

Referring to FIGS. 6A and 6B, the bending panel manufacturing apparatus 10-2 includes a first mold 200-2, a second mold 100-2, and a third mold 300-2. The descriptions of the lower mold 200 described in FIGS. 1A and 1B may be applied to each component of the first mold 200-2. The descriptions of the upper mold 100 described in FIGS. 1A and 1B may be applied to each component of the second mold 100-2. The descriptions of the side mold 300 described in FIGS. 1A and 1B may be applied to each component of the third mold 300-2.

The bending panel manufacturing apparatus 10-2 shown in FIGS. 6A and 6B may have a structure in which the upper mold and the lower mold are substantially inverted to each other in the bending panel manufacturing apparatus 10 shown in FIGS. 1A and 1B. That is, the first mold 200-2 is disposed above the second mold 100-2 in the third direction DR3. The third mold 300-2 may be disposed at both sides of the first mold 200-2 in the first direction DR1 and the second direction DR2.

Contrary to FIGS. 1A and 1B, according to the bending panel manufacturing apparatus 10-2 shown in FIGS. 6A and 6B, since the second mold 100-2 is disposed at a lower side in the third direction DR3, the target panel may be placed on the second mold 100-2, and then the bending process may proceed. The target panel may be placed on a first pressing member 101-2 of the second mold 100-2, the second mold 100-2 may move upward due to an operation of a first moving unit 103-2, and thus the target panel may be primarily pressed between a stage 201-2 of the first mold 200-2 and the first pressing member 101-2. Then, the target panel that is primarily pressed may be secondarily pressed by second pressing members 311-2, 321-2, 331-2, and 341-2 included in the third mold 300-2.

In FIGS. 6A and 6B, the second mold 100-2 moves upward along the third direction DR3 due to the operation of the first moving unit 103-2 to primarily press the target panel, however, it should not be limited thereto or thereby. That is, a moving unit that moves a mold in the third direction DR3 may be included in the first mold 200-2 and the third mold 300-2. In this case, the operation of primarily pressing the target panel may be performed by moving the first mold 200-2 and the third mold 300-2 along the third direction DR3 by the moving unit connected to the first mold 200-2 and the third mold 300-2.

Hereinafter, a bending panel according to an exemplary embodiment will be described with reference to accompanying drawings.

Figure 7A:
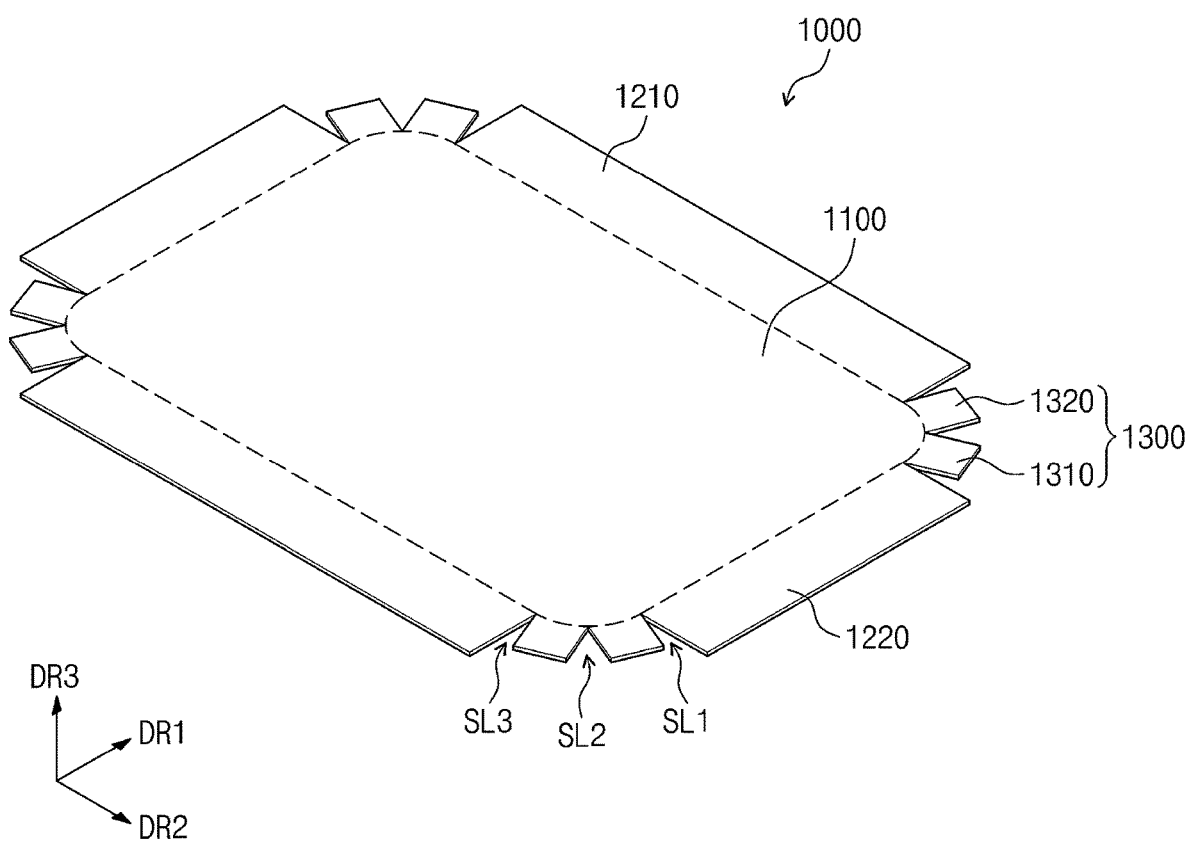
FIG. 7A is a perspective view of an exemplary embodiment of a bending panel constructed according to the principles of the invention in a substantially flat, planar state.
Figure 7B:
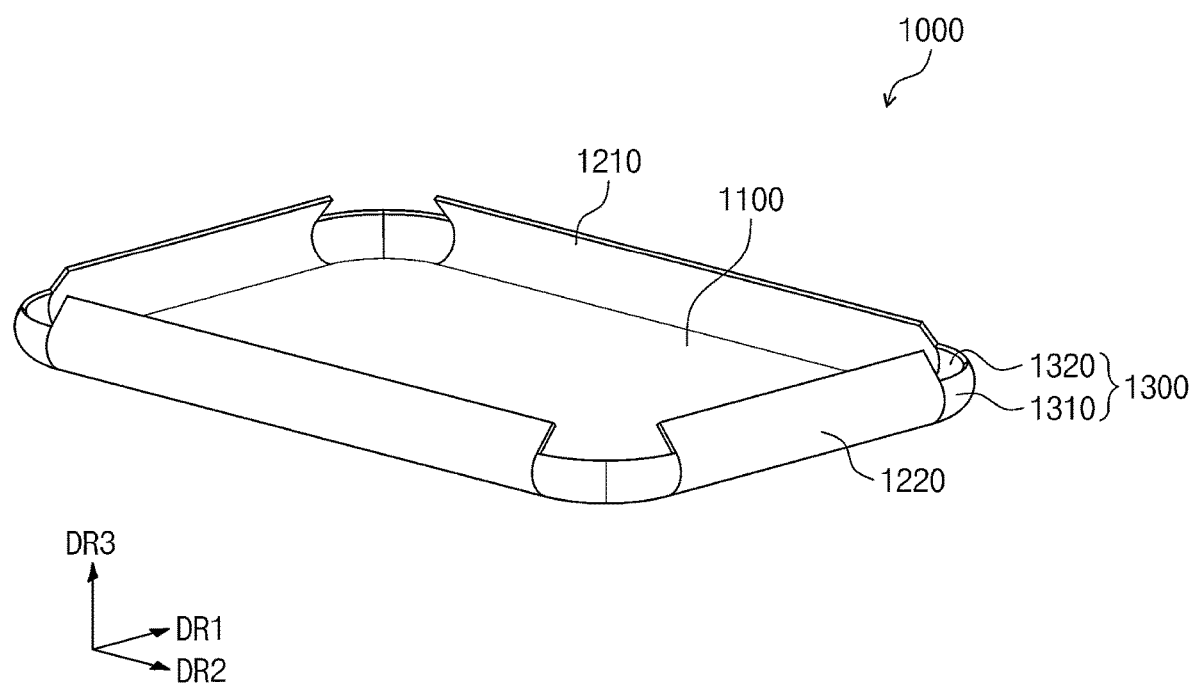
FIG. 7B is a perspective view of the bending panel of FIG. 7A in a bent state.
Figure 7C:
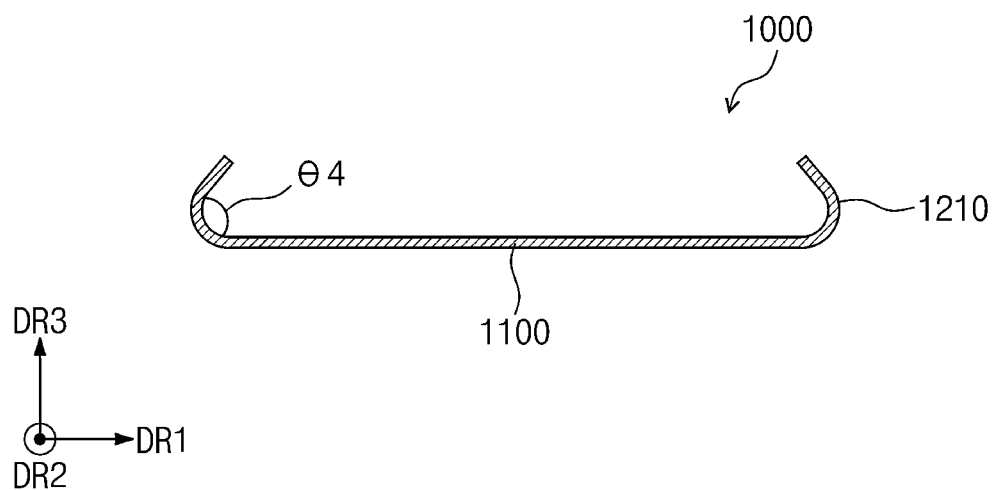
FIG. 7C is a front view of the bending panel of FIG. 7B
Figure 7D:
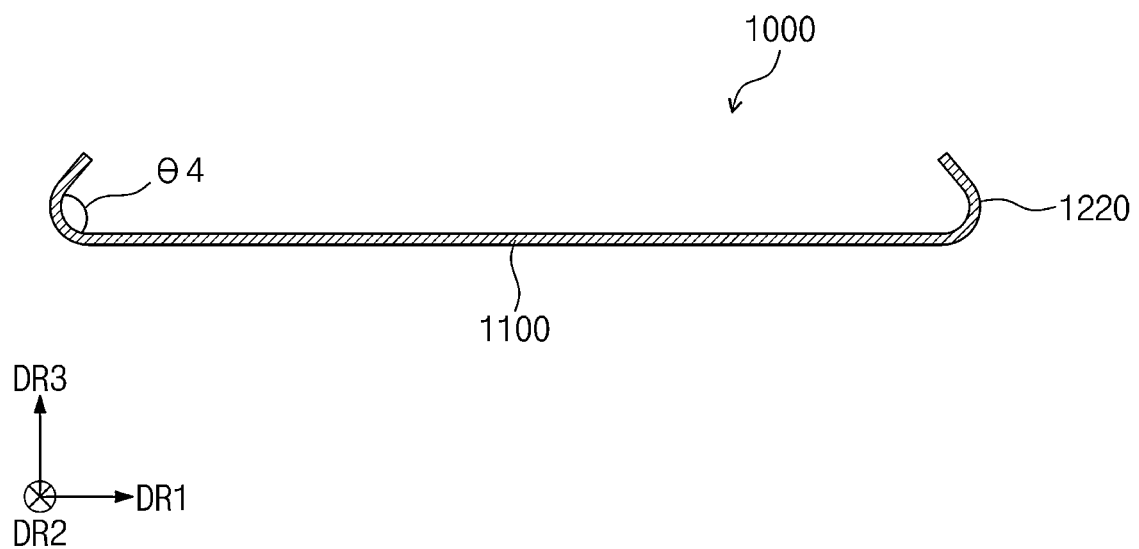
FIG. 7D is a side view of the bending panel of FIG. 7B
Figure 7E:
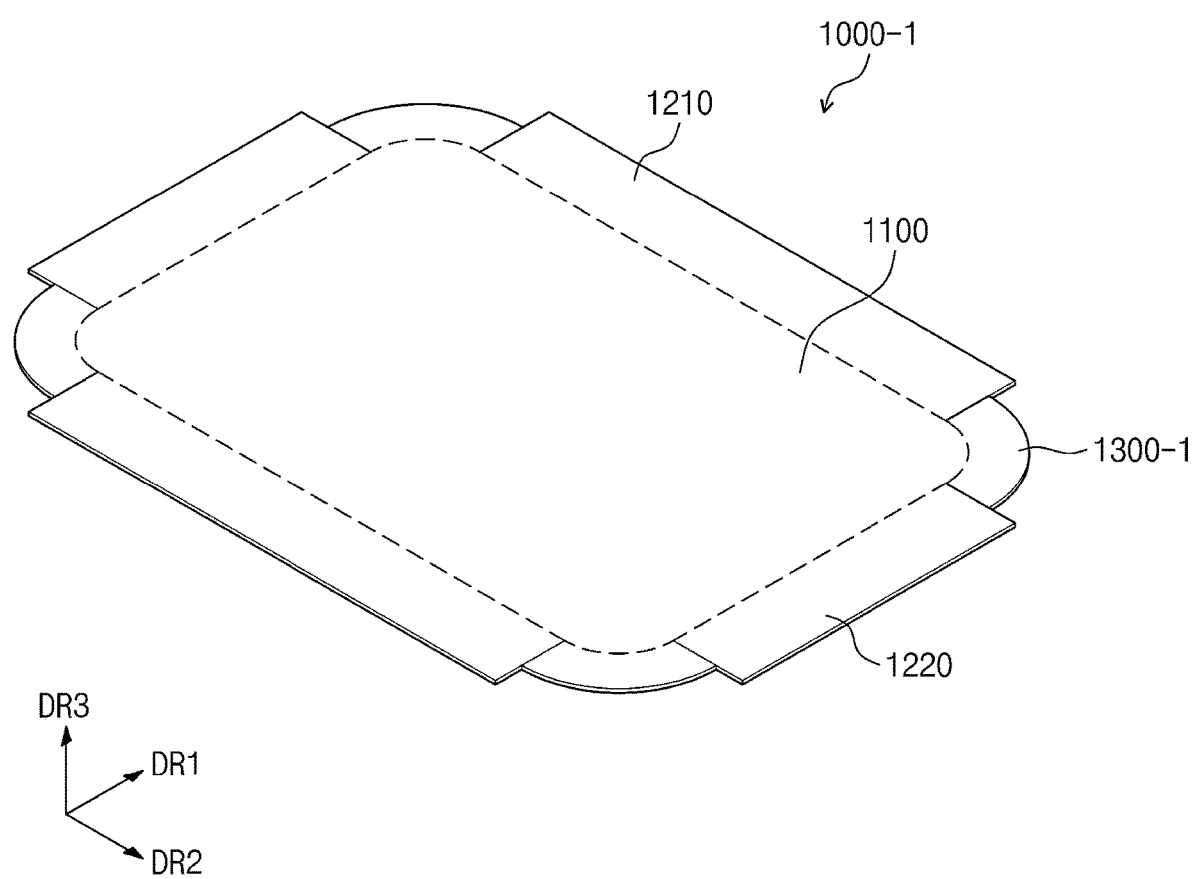
FIG. 7E is a perspective view of another exemplary embodiment of a bending panel constructed according to the principles of the invention in a substantially flat, planar state.

FIG. 7A is a perspective view of an exemplary embodiment of a bending panel 1000 constructed according to the principles of the invention in a substantially flat, planar state. FIG. 7B is a perspective view of the bending panel 1000 of FIG. 7A in a bent state. FIG. 7C is a front view of the bending panel 1000 of FIG. 7B. FIG. 7D is a side view of the bending panel 1000 of FIG. 7B. FIG. 7A shows a planar state of the bending panel 1000 before the bending panel 1000 is bent. FIGS. 7B to 7D show the bending panel 1000 in the bent state. FIG. 7E is a perspective view of an exemplary embodiment of a bending panel 1000-1 constructed according to the principles of the invention in a substantially flat, planar state.

Referring FIGS. 7A to 7D, the bending panel 1000 may be a any member to be applied to a display device, such as a protective film. In an exemplary embodiment, the bending panel 1000 may be the protective film that is disposed on one surface (e.g. bottom surface) of a display panel of the display device and protects the display panel.

The bending panel 1000 includes a flat portion 1100 and bending portions 1210, 1220, and 1300. The flat portion 1100 is disposed at a center of the bending panel 1000, and the bending portions 1210, 1220, and 1300 are disposed to surround an edge of the flat portion 1100.

The flat portion 1100 is substantially parallel to a plane defined by the first direction DR1 and the second direction DR2. In the exemplary embodiment, the flat portion 1100 has a substantially rectangular shape with curved vertices, however, it should not be limited thereto or thereby. That is, the flat portion 1100 may have various shapes depending on a shape of the display device to which the bending panel 1000 is applied.

The bending portions 1210, 1220, and 1300 may include first bending portions 1210, second bending portions 1220, and third bending portions 1300. The first bending portions 1210 may extend in the second direction DR2 and may be disposed to be spaced apart from each other in the first direction DR1 with the flat portion 1100 interposed therebetween. The second bending portions 1220 may extend in the first direction DR1 and may be disposed to be spaced apart from each other in the second direction DR2 with the flat portion 1100 interposed therebetween. The third bending portions 1300 may be disposed between the first bending portions 1210 and the second bending portions 1220 and may be disposed at vertices of the flat portion 1100. In the bent state of the bending panel 1000, the height in the third direction DR3 of the third bending portions 1300 may be smaller than the height in the third direction DR3 of the first bending portions 1210 and the second bending portions 1220.

In the bent state of the bending panel 1000, the first bending portions 1210 and the second bending portions 1220 may be bent upward. The first bending portions 1210 and the second bending portions 1220 may be bent in an upward direction of the bending panel 1000 along the third direction DR3. In the bending panel 1000, the first bending portions 1210 and the second bending portions 1220 may be bent by about 90 degrees or more. For example, the angles of the first bending portions 1210 and the second bending portions 1220 may be "180−θ4" degrees as shown in FIG. 7C. That is, a fourth angle θ4 between the flat portion 1100 and the first bending portion 1210 and between the flat portion 1100 and the second bending portion 1220 may be smaller than about 90 degrees as shown in FIG. 7C. The bending panel 1000 may be bent by the above-described bending panel manufacturing apparatus, and the fourth angle θ4 between the flat portion 1100 and the first bending portion 1210 and between the flat portion 1100 and the second bending portion 1220 may be substantially the same as the first angle θ1 between the side surface 101-LS and the lower surface 101-US of the upper pressing member 101 (refer to FIG. 2C) of the bending panel manufacturing apparatus.

In the bent state of the bending panel 1000, the third bending portions 1300 may have a curved or rounded shape. The third bending portions 1300 may be disposed between the first bending portions 1210 and the second bending portions 1220 to have the rounded shape. The bending panel 1000 may be bent by the above-described bending panel manufacturing apparatus, and the bent shape of the third bending portions 1300 may correspond to the round shape of the third pressing portion 101-3 of the upper pressing member 101 (refer to FIG. 2B) and the round shape of the outer-bending forming portion 213 of the lower mold 200 of the bending panel manufacturing apparatus.

A plurality of slits SL1 and SL3 may be defined between the first bending portions 1210 and the third bending portions 1300 and between the second bending portions 1220 and the third bending portions 1300. The third bending portions 1300 may include a first sub-bending portion 1310 and a second sub-bending portion 1320, and a plurality of slits SL2 may be defined between the first sub-bending portion 1310 and the second sub-bending portion 1320. As the slits SL1, SL2, and SL3 are defined between the first bending portions 1210 and the third bending portions 1300, between the second bending portions 1220 and the third bending portions 1300, and between the first and second sub-bending portions 1310 and 1320, the first, second, and third bending portions 1210, 1220, and 1300 may be bent without overlapping with each other when the bending panel 1000 is bent. In particular, the vertex portions of the bending panel 1000 may be effectively bent.

Referring to FIG. 7E, a slit is not defined in the bending panel 1000-1, and a third bending portion 1300-1 having a single unitary shape may be disposed between the first bending portion 1210 and the second bending portion 1220. Although the slit is not defined in the bending panel 1000-1, when the third bending portion 1300-1 of the bending panel 1000-1 is pressed by the third pressing portion 101-3 of the upper pressing member 101 (refer to FIG. 2B) and the outer-bending forming portion 213 of the lower mold 200 of the bending panel manufacturing apparatus, the material of the bending panel 1000-1 may be stretched and the third bending portion 1300-1 may have the round shape.

Hereinafter, an exemplary method of manufacturing the display device will be described with reference to figures.

The exemplary manufacturing method of the display device includes coupling the display panel to a first portion (e.g., lower portion) of a window member and coupling the protective film to a first portion (e.g., lower portion) of the display panel. The steps of coupling the protective film include the steps of bending both ends of the protective film, disposing the bent protective film on the lower portion of the display panel, and coupling the display panel to the protective film.

Figure 8A:
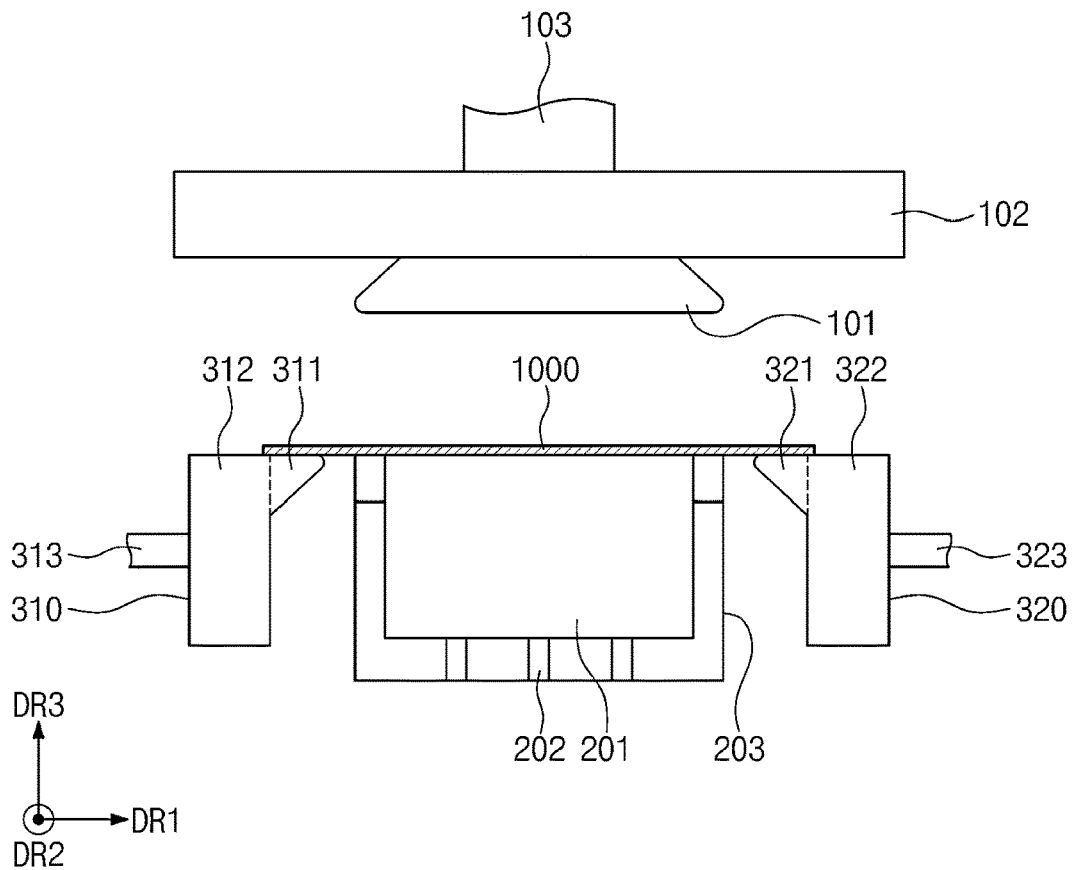
FIGS. 8A, 8B, 8C, 8D, 8E, 8F, 8G, 8H, and 8I are cross-sectional views sequentially showing an exemplary method of manufacturing a display device according to the principles of the invention.
Figure 8B:
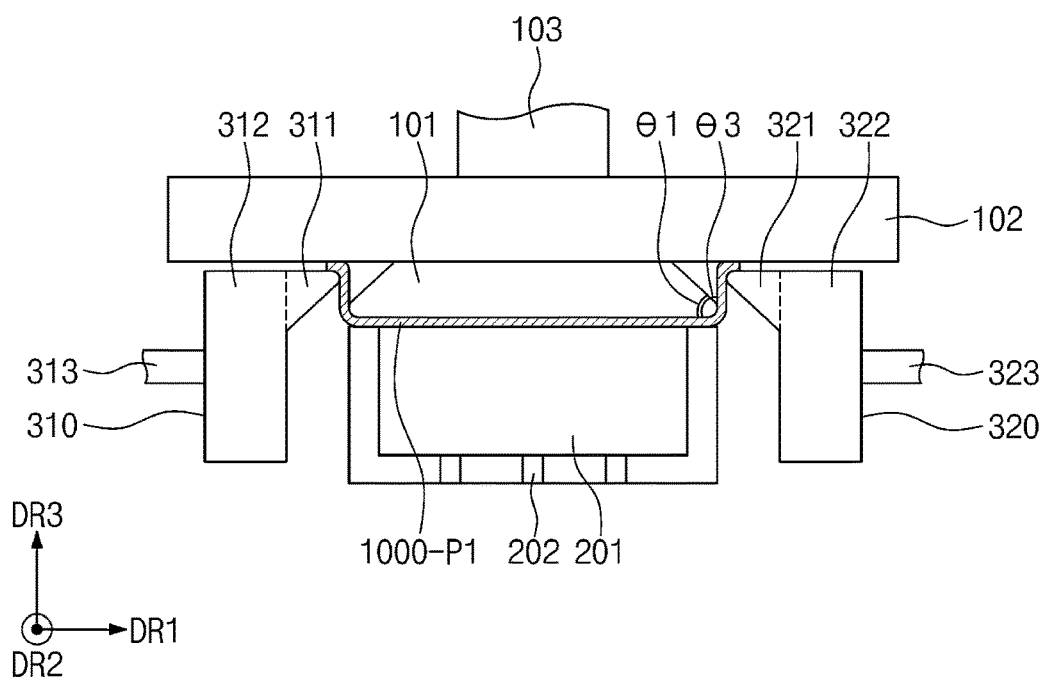
Figure 8C:
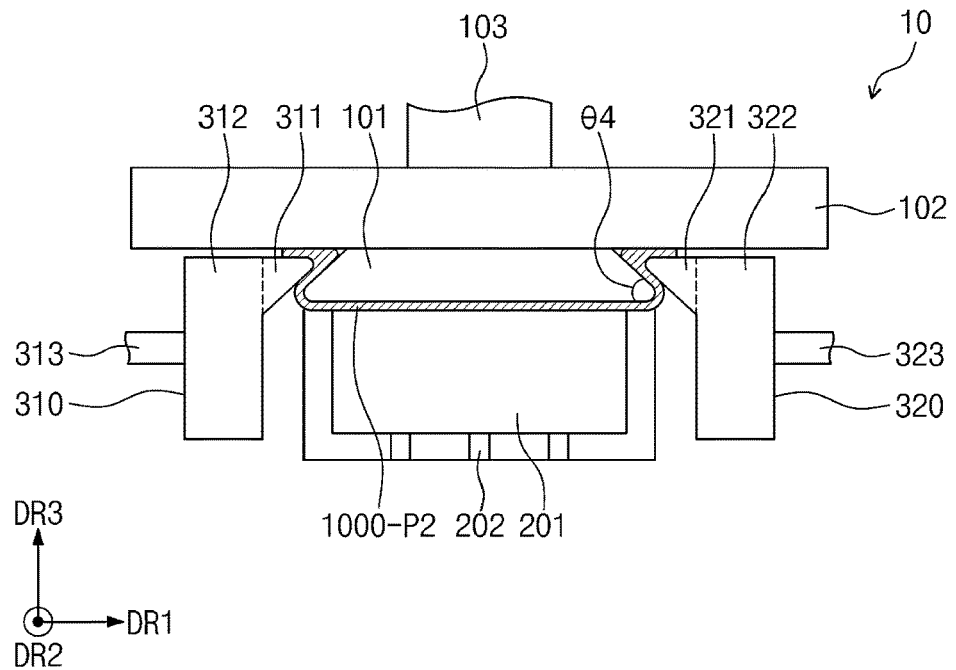
Figure 8D:
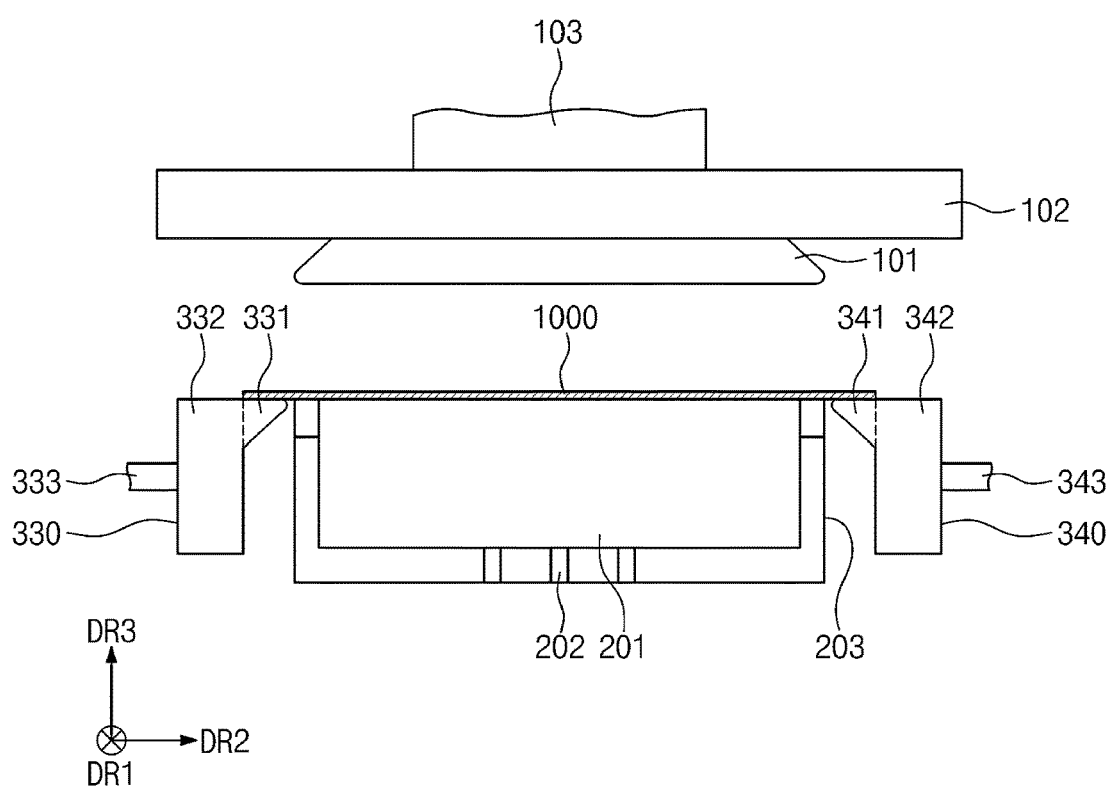
Figure 8E:
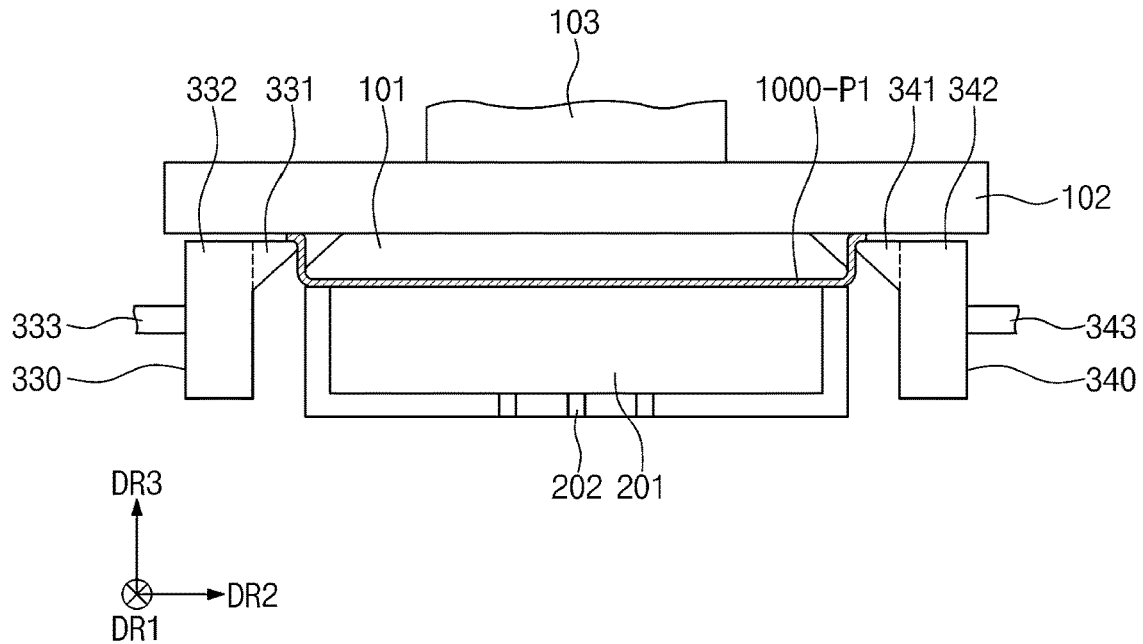
Figure 8F:
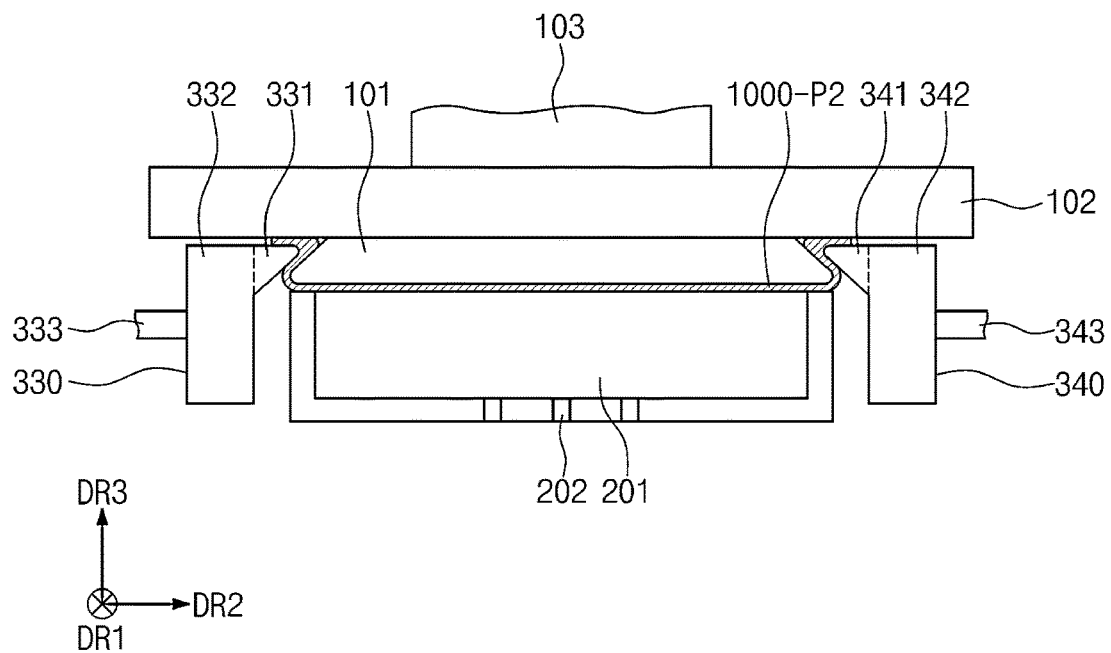
Figure 8G:
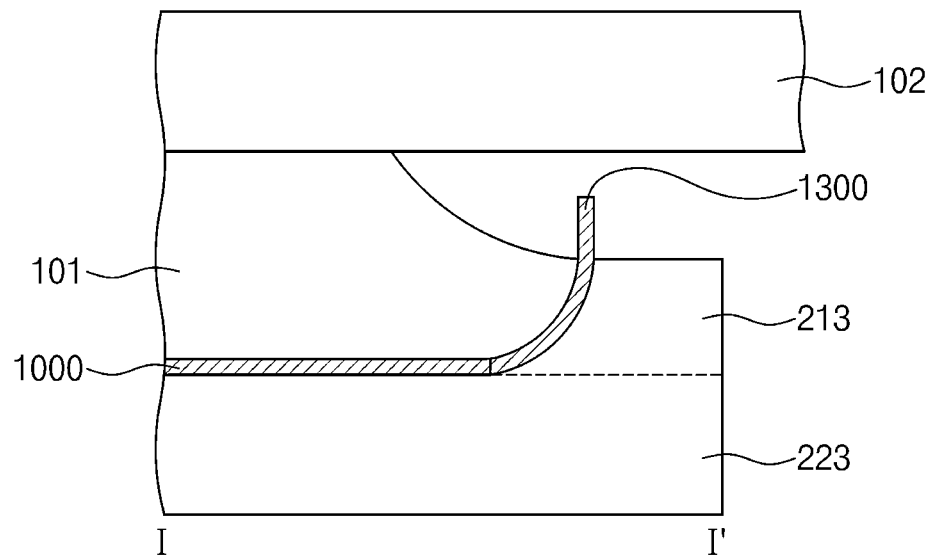
Figure 8H:
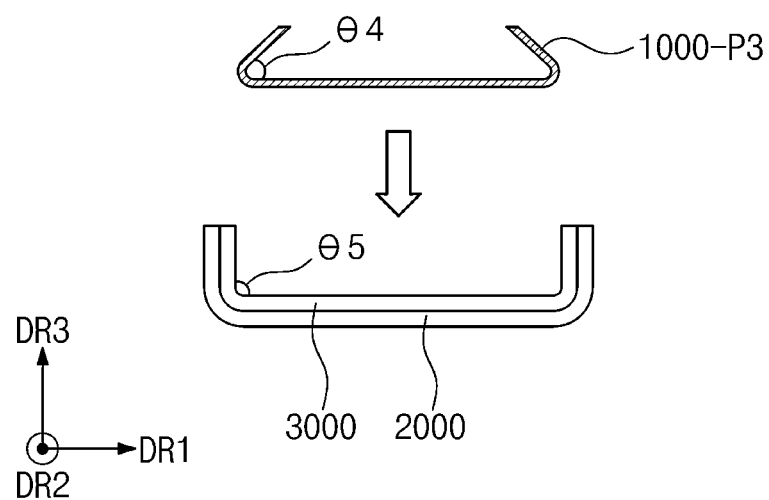
Figure 8I:
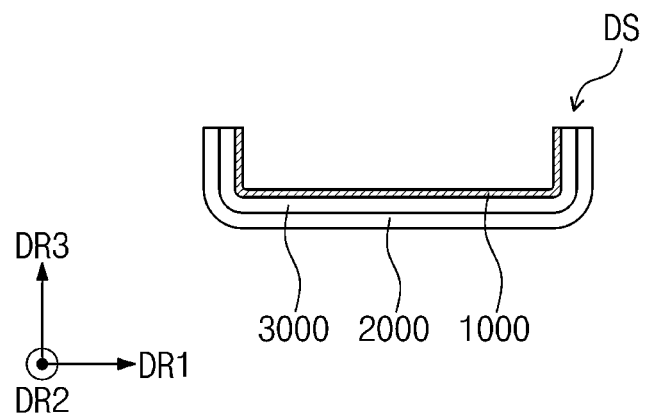

FIGS. 8A to 8I are cross-sectional views of an exemplary embodiment sequentially showing an exemplary method of manufacturing the display device according to the principles of the invention. FIGS. 8A to 8F sequentially show the steps of bending the protective film of the manufacturing method of the display device. FIG. 8G schematically shows a cross-section corresponding to a line I-I' of FIG. 3C in the step of bending the protective film of the manufacturing method of the display device. FIGS. 8H and 8I show the steps of disposing the bent protective film on the lower portion of the display panel of the manufacturing method of the display device.

FIGS. 8A to 8C sequentially show the step of bending the protective film when viewed in a cross-section corresponding to the plane defined by the first direction DR1 and the third direction DR3. FIGS. 8D to 8F sequentially show the step of bending the protective film when viewed in a cross-section corresponding to the plane defined by the second direction DR2 and the third direction DR3. Hereinafter, the step of bending the protective film will be described with reference to FIGS. 8A to 8F.

Referring to FIGS. 8A and 8D, the manufacturing method of the display device includes the step of disposing the target panel 1000 on the stage 201. In the manufacturing method of the display device, the target panel 1000 may be the protective film applied to the display device. In the exemplary embodiment, the target panel 1000 may be the protective film disposed on a first surface (e.g. bottom surface) of the display panel of the display device to protect the display panel. When the target panel 1000 is placed on the stage 201, an outer portion of the target panel 1000 may be placed on some of the side molds 310, 320, 330, and 340.

Referring to FIGS. 8A, 8B, 8D, and 8E, the manufacturing method of the display device includes the step of pressing the upper portion of the target panel 1000 using the upper pressing member 101. The upper pressing member 101 may move downward by the operation of the first moving unit 103 and may press the upper portion of the target panel 1000. As the upper pressing member 101 presses the upper portion of the target panel 1000, the elastic member 202 disposed under the stage 201 may be compressed, and the stage 201 may move downward.

In the step of pressing the upper portion of the target panel 1000 using the upper pressing member 101, the outer portion of the target panel 1000 may be bent by a third angle $\theta 3$. The outer portion of the target panel 1000 may be primarily bent by the upper pressing member 101 such that the angle between the bent portion and the flat portion becomes the third angle $\theta 3$. The third angle $\theta 3$ may be greater than the first angle $\theta 1$ of the corner of the upper pressing member 101. In the step of pressing the upper portion of the target panel 1000 using the upper pressing member 101, the heater 104 may provide heat to the upper plate 102 connected to the upper pressing member 101, and the target panel 1000 may be thermoformed by the heat provided to the upper pressing member 101.

Referring to FIGS. 8B, 8C, 8E, and 8F, the manufacturing method of the display device includes the step of pressing the bending portion of the target panel 1000, which is primarily bent, using the side pressing members 311, 321, 331, and 341. The side pressing members 311, 321, 331, and 341 move to the stage 201 by the step of the second moving units 313, 323, 333, and 343 and press the bent side surface of the target panel 1000 that is primarily bent.

In the step of pressing of the bending portion of the target panel 1000, which is primarily bent, using the side pressing members 311, 321, 331, and 341, the outer portion of the target panel 1000 may be bent by the fourth angle $\theta 4$. The outer portion of the target panel 1000 may be primarily bent by the upper pressing member 101 and may be secondarily bent by the side pressing members 311, 321, 331, and 341, and thus the angle between the bent portion and the flat portion may become the fourth angle $\theta 4$. The fourth angle $\theta 4$ may be smaller than the third angle $\theta 3$ that is obtained after the primary bending. The fourth angle $\theta 4$ may be substantially the same as the first angle $\theta 1$ of the corner of the upper pressing member 101. The fourth angle $\theta 4$ may be smaller than about 90 degrees. In the step of pressing of a side portion of the target panel 1000 using the side pressing members 311, 321, 331, and 341, the heater 314, 324, 334, and 344 may provide the heat to the side plates 312, 322, 332, and 342 connected to the side pressing members 311, 321, 331, and 341, and the target panel 1000 may be thermoformed by the heat transferred to the side pressing members 311, 321, 331, and 341.

Referring to FIG. 8G, the vertex portions of the target panel 1000 may be bent by the upper pressing member 101 and the outer-bending forming portion 213 of the lower mold in the exemplary manufacturing method of the display device. In detail, the third pressing portion 101-3 (refer to FIG. 2B) of the upper pressing member 101 and the outer-bending forming portion 213 (refer to FIG. 3B) may have rounded shapes corresponding to each other. In the vertex portions of the target panel 1000, the third bending portion 1300 of the target panel 1000 disposed between the third pressing portion 101-3 and the outer-bending forming portion 213 may be bent to have the rounded shape by the shape of the third pressing portion 101-3 and the outer-bending forming portion 213 that are engaged with each other.

Referring to FIGS. 8H and 8I, the target panel bent by the bending panel manufacturing apparatus may be coupled to the window member 2000 and the display panel 3000. The target panel may be a protective film 1000-P3 that protects the display panel 3000. Referring to FIG. 8H, the protective film 1000-P3 may be bent at about 90 degrees or more by the bending panel manufacturing apparatus, and the fourth angle $\theta 4$ formed between the flat portion and the bending portion of the protective film 1000-P3 may be smaller than about 90 degrees. The outer portion of the window member 2000 and the outer portion of the display panel 3000 may be bent at a relatively smaller angle than the protective film 1000-P3. In the exemplary embodiment, the window member 2000 and the display panel 3000 may be bent at about 90 degrees. A fifth angle $\theta 5$ between the bending portion and the flat portion of each of the window member 2000 and the display panel 3000 may be about 90 degrees. The fifth angle $\theta 5$ between the bending portion and the flat portion of each of the window member 2000 and the display panel 300 may be greater than the fourth angle $\theta 4$. The protective film 1000-P3 bent at the fourth angle $\theta 4$ may be disposed under the display panel 3000 and may be attached to the display panel 3000 by being pressed using a roller. Referring to FIG. 8I, in the display device DS to which the protective film 1000 is attached, the protective film 1000 may be stretched to allow the bending angle of the protective film 1000 to correspond to the bending angle of the window member 2000 and the display panel 3000.

In the exemplary manufacturing method of the display device, the protective film is bent by the bending panel manufacturing apparatus before the protective film is coupled to the lower portion of the display panel, and the bent protective film is coupled to the lower portion of the display panel. In more detail, the display panel and the window member are bent at a predetermined angle, the protective film is bent at an angle greater than the bending angle of the display panel and the window member, and then the protective film is coupled to the lower portion of the display panel.

In a case where the protective film is coupled to the display panel and the window member without being bent, the display panel and the protective film may be separated from each other by the repulsive force of the material of the protective film, and the reliability of the display panel is reduced. According to the exemplary manufacturing method of the display device, since the protective film is pre-bent before being coupled to the lower portion of the display panel, the protective film may be prevented from being separated from the display panel even though the protective film is coupled to the display panel having a curvature, and thus the reliability of the display device may be improved. In particular, since the protective film is coupled to the display panel and the window member after being bent at the angle greater than the bending angle of the display panel and the window member, the separation of the protective film due to the repulsive force of its material may be minimized.

Figure 9A:
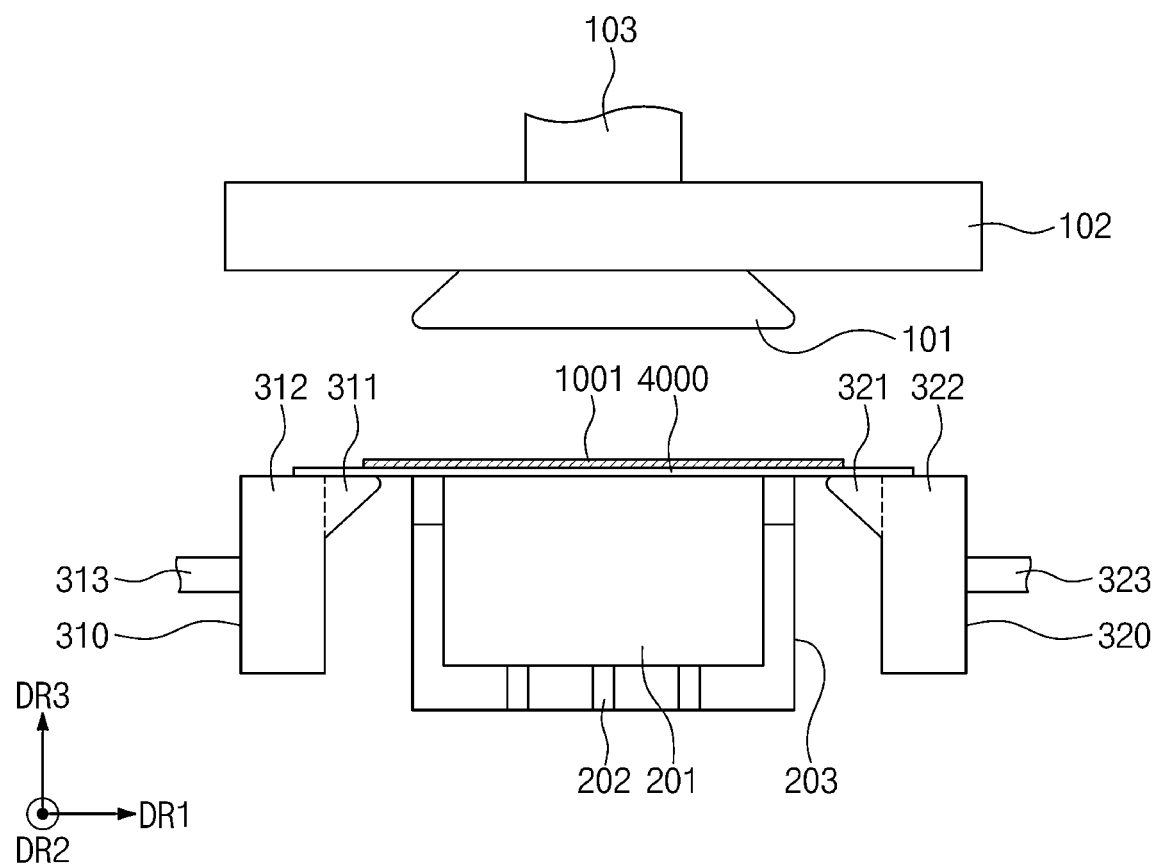
FIGS. 9A, 9B, and 9C are cross-sectional views sequentially showing some steps of another exemplary method of manufacturing a display device according to the principles of the invention.
Figure 9B:
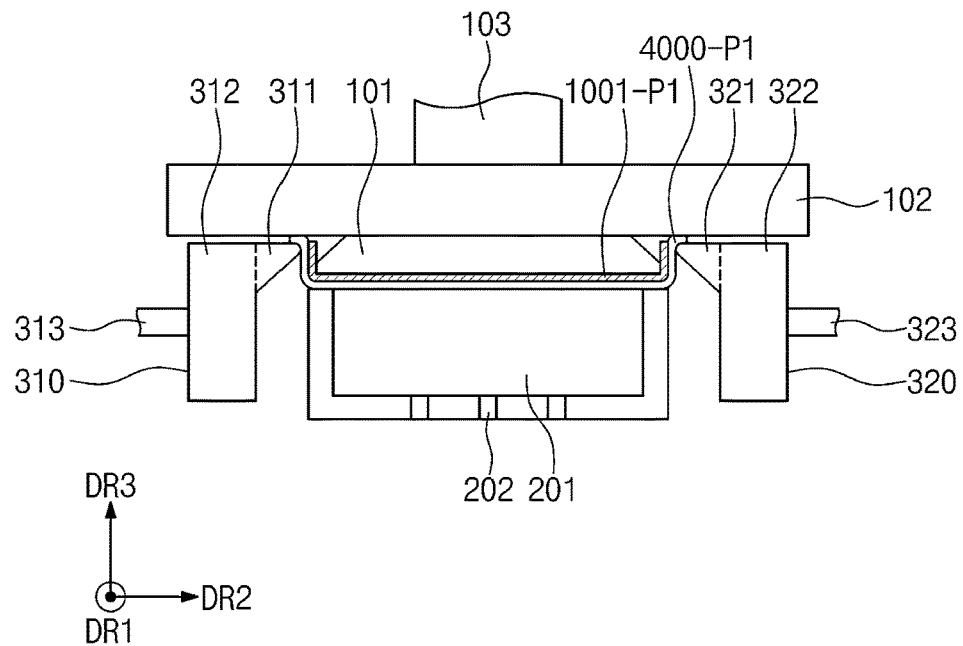
Figure 9C:
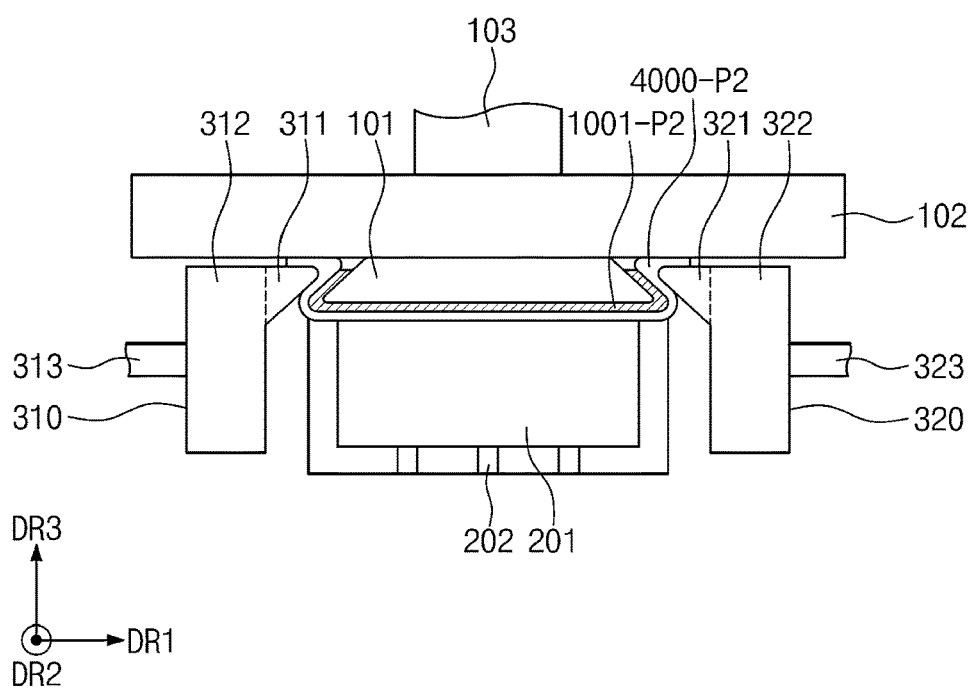

FIGS. 9A, 9B, and 9C are cross-sectional views sequentially showing some steps of another exemplary method of manufacturing the display device according to the principles of the invention. FIGS. 9A to 9C show the process of bending the protective film of the method of manufacturing the display device. In FIGS. 9A to 9C, the same reference numerals denote the same elements in FIGS. 1A to 8I, and thus detailed descriptions of the same elements will be omitted.

Referring to FIGS. 9A to 9C, the manufacturing method of the display device may include the step of disposing a cover film (e.g., release film) 4000 under a protective film 1001 before the protective film 1001 is placed on a stage 201. In FIGS. 9A to 9C, the cover film 4000 is disposed only under the protective film 1001, however, it should not be limited thereto or thereby. The cover film 4000 may be also disposed on the protective film 1001.

The cover film 4000 may prevent the protective film 1001 from being damaged in the operation of bending the protective film 1001 and may prevent the protective film 1001 from being attached to the bending panel manufacturing apparatus due to an adhesive force of the protective film 1001. As the cover film 4000 is disposed under and/or on the protective film 1001, the upper pressing member 101 and the side pressing members 311 and 321 may press the cover film 4000 to bend the protective film 1001 without directly pressing the protective film 1001. The cover film 4000 may be removed after the protective film 1001 is bent using the bending panel manufacturing apparatus and before the protective film 1001 is coupled to the lower portion of the display panel.

Figure 10:
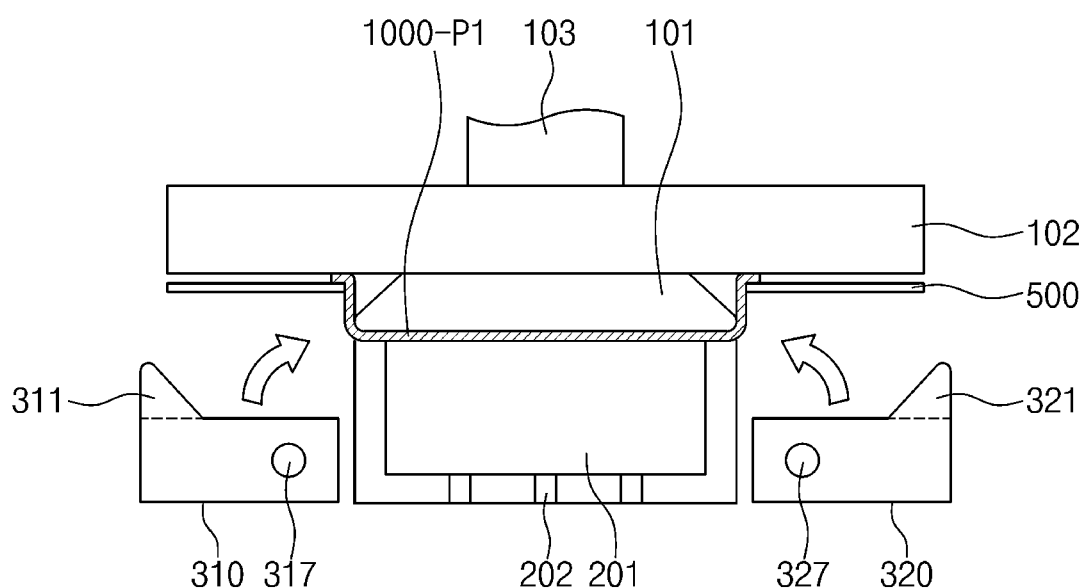
FIG. 10 is a cross-sectional view showing a step of still another exemplary method of manufacturing a display device according to the principles of the invention.

FIG. 10 is a cross-sectional view showing a step of still another exemplary method of manufacturing a display device according to the principles of the invention. FIG. 10 shows the step of pressing a protective film by side molds 310 and 320 to bend the protective film of the manufacturing method of the display device. In FIG. 10, the same reference numerals denote the same elements in FIGS. 1A to 9C, and thus detailed descriptions of the same elements will be omitted to avoid redundancy.

Referring to FIG. 10, in the step of pressing a side portion of a target panel 1000 using side pressing members 311 and 321 of the manufacturing method of the display device, the side molds 310 and 320 do not move left and right along the first direction DR1 but rotate about rotating shafts 317 and 327 to press the side portion of the target panel 1000. That is, when the side molds 310 and 320 may rotate about the rotating shafts 317 and 327, the side pressing members 311 and 321 may secondarily press the side portion of the target panel 1000, which is primarily bent. In this case, since upper surfaces of the side pressing members 311 and 321 do not support the target panel 1000 before the second pressing operation, the bending panel manufacturing apparatus may further include a supporter 500 that supports an outer portion of the target panel 1000.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method of manufacturing a display device, the method comprising the steps of:
coupling a display panel to a first portion of a window member; and
coupling a protective film to a first portion of the display panel, the step of coupling of the protective film further comprising the steps of:
bending first portions, second portions, and third portions of the protective film to an angle of 90 degrees or more; and
disposing the bent protective film on the lower portion of the display panel,
wherein the first portions extend along an edge of the protective film in a second direction, the second portions extend along an edge of the protective film in a first direction that is normal to the second direction, and the third portions are disposed between the first portions and the second portions,
wherein a height, after bending, of the first portions and the second portions in a third direction normal to the first direction and the second direction is greater than a height of the third portions in the third direction.

2. The method of claim 1, wherein the step of bending of the first portions, second portions, and third portions of the protective film further comprises the steps of:
placing the protective film on a support;
pressing an upper portion of the protective film to bend the first portions, second portions, and third portions at a first angle; and
pressing a side portion bent at the first angle to bend the first portions, second portions, and third portions at a second angle greater than the first angle.

3. The method of claim 2, wherein an elastic member is disposed under the support, and wherein the step of pressing of the upper portion of the protective film comprises compressing the elastic member.

4. The method of claim 2, wherein the step of pressing of the upper portion of the protective film further comprises the step of indirectly applying heat to the upper portion of the protective film.

5. The method of claim 2, wherein the step of pressing of the side portion of the protective film further comprises the step of indirectly applying heat to a side portion of the protective film.

6. The method of claim 2, wherein the step of pressing of the side portion of the protective film is performed by horizontally moving one or more side pressing members or by rotating the one or more side pressing members.

7. The method of claim 2, wherein the step of bending of the first portions, second portions, and third portions of the protective film further comprises the steps of:
disposing a release film under the protective film before the placing the protective film on the support; and
removing the release film before coupling the display panel to the protective film.

8. The method of claim 2, further comprising, before the step of coupling of the lower portion of the display panel to the protective film, bending outer portions of the window member and the display panel at a third angle smaller than the second angle at which the protective film is bent.

* * * * *